US012155606B2

(12) United States Patent
Takeda et al.

(10) Patent No.: US 12,155,606 B2
(45) Date of Patent: Nov. 26, 2024

(54) CROSS-CARRIER SCHEDULING TECHNIQUES FOR WIRELESS COMMUNICATIONS SYSTEMS

(71) Applicant: QUALCOMM Incorporated, San Diego, CA (US)

(72) Inventors: Kazuki Takeda, Tokyo (JP); Wanshi Chen, San Diego, CA (US); Peter Gaal, San Diego, CA (US); Yiqing Cao, Beijing (CN); Alberto Rico Alvarino, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 297 days.

(21) Appl. No.: 17/758,201

(22) PCT Filed: Jan. 27, 2021

(86) PCT No.: PCT/CN2021/073901
§ 371 (c)(1),
(2) Date: Jun. 29, 2022

(87) PCT Pub. No.: WO2021/151378
PCT Pub. Date: Aug. 5, 2021

(65) Prior Publication Data
US 2022/0416987 A1    Dec. 29, 2022

(30) Foreign Application Priority Data

Jan. 29, 2020  (WO) ................ PCT/CN2020/074062

(51) Int. Cl.
*H04L 5/00* (2006.01)
*H04W 72/0453* (2023.01)
*H04W 72/51* (2023.01)

(52) U.S. Cl.
CPC ............ *H04L 5/0094* (2013.01); *H04L 5/001* (2013.01); *H04L 5/0053* (2013.01); *H04W 72/0453* (2013.01); *H04W 72/51* (2023.01)

(58) Field of Classification Search
CPC ..... H04L 5/0094; H04L 5/001; H04L 5/0053; H04W 72/51; H04W 72/0453
See application file for complete search history.

(56) References Cited

U.S. PATENT DOCUMENTS

2014/0119263 A1  5/2014  Shauh et al.
2016/0164622 A1  6/2016  Yi et al.
(Continued)

FOREIGN PATENT DOCUMENTS

CN   104756566      7/2015
CN   104937865 A    9/2015
(Continued)

OTHER PUBLICATIONS

International Search Report and Written Opinion—PCT/CN2020/074062—ISA/EPO—Oct. 27, 2020.
(Continued)

*Primary Examiner* — Natasha W Cosme
(74) *Attorney, Agent, or Firm* — Holland & Hart LLP

(57) ABSTRACT

Methods, systems, and devices for wireless communications are described. A user equipment (UE) may identify that the UE is in communication with a primary cell and a secondary cell in a carrier aggregation configuration, where the primary cell is a cross-carrier scheduled cell and the secondary cell is a cross-carrier scheduling cell. The UE may receive downlink control information from the secondary cell. The
(Continued)

downlink control information may include a cross-carrier scheduling indication that a data transmission is scheduled with the primary cell. The UE may monitor a common search space of the primary cell for control information that pertains to communications with the primary cell. The UE may communicate with the primary cell via the data transmission in accordance with at least one of the downlink control information from the secondary cell and the control information from the common search space of the primary cell.

44 Claims, 17 Drawing Sheets

(56) References Cited

U.S. PATENT DOCUMENTS

| | | |
|---|---|---|
| 2017/0086172 A1 | 3/2017 | Dinan |
| 2018/0332576 A1 | 11/2018 | Oh et al. |

FOREIGN PATENT DOCUMENTS

| | | |
|---|---|---|
| CN | 107211419 A | 9/2017 |
| CN | 109274470 A | 1/2019 |
| EP | 3429245 A1 | 1/2019 |
| WO | WO-2014065997 | 5/2014 |
| WO | WO-2014112833 A1 | 7/2014 |
| WO | WO-2014203941 A1 | 12/2014 |
| WO | WO-2022029316 A1 | 2/2022 |

OTHER PUBLICATIONS

International Search Report and Written Opinion—PCT/CN2021/073901—ISA/EPO—Apr. 16, 2021.
NEC: "On separate PUCCH and RA Procedure for SeNB in Dual Connectivity", 3GPP TSG-RAN WG1# 76 R1-140488, Jan. 31, 2014, pp. 1-5, Internet URL: http://www.3gpp.org/ftp/tsg_ran/WG1_RL1/TSGR1_76/Docs/R1-140488.zip.
NTT DOCOMO, Inc: "UL Data Transmission Procedure," 3GPP TSG RAN WG1 Meeting #93, R1-1807068, May 21-25, 2018, May 25, 2018 (May 25, 2018), pp. 1-8, the whole document.
Ericsson: "Correction to cross carrier scheduling", 3GPP TSG-RAN2 Meeting #103bis, R2-1814974, Chengdu, China, Oct. 8, 2018 to Oct. 12, 2018, Sep. 28, 2018, 15 Pages.
VIVO: "On the search space of cross carrier scheduling", 3GPP TSG-RAN WG2 Meeting #103bis, R2-1814188, Chengdu, China, Oct. 8-12, 2018, Sep. 28, 2018, 7 Pages.
Huawei, et al., "Remaining Issues on Bandwidth Part and CA", 3GPP TSG RAN WG1 Meeting #94, R1-1809752, 3rd Generation Partnership Project, Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 22, 2018, 24 Pages, XP051517113, section 2.4.
Panasonic: "Overriding of SPS Resource for Carrier Aggregation", 3GPP TSG-RAN WG2 Meeting #70bis, R2-103601, 3rd Generation Partnership Project, Mobile Competence Centre, 650, Route Des Lucioles, F-06921 Sophia-Antipolis Cedex, France, vol. Ran WG2, No. Stockholm, Sweden, Jun. 28, 2010, Jun. 22, 2010, 2 Pages, XP050451148, p. 1-p. 2.
Supplementary European Search Report - EP21747301—Search Authority—The Hague—Feb. 19, 2024.

CROSS-CARRIER SCHEDULING TECHNIQUES FOR WIRELESS COMMUNICATIONS SYSTEMS

CROSS-REFERENCE

The present Application is a 371 national stage filing of International PCT Application No. PCT/CN2021/073901 by Takeda et al. entitled "CROSS-CARRIER SCHEDULING TECHNIQUES FOR WIRELESS COMMUNICATIONS SYSTEMS," filed Jan. 27, 2021; and claims priority to International Patent Application No. PCT/CN2020/074062 by Takeda et al., entitled "CROSS-CARRIER SCHEDULING TECHNIQUES FOR WIRELESS COMMUNICATIONS SYSTEMS," filed Jan. 29, 2020; each of which is assigned to the assignee hereof, and each of which is expressly incorporated by reference in its entirety herein.

FIELD OF TECHNOLOGY

The following relates generally to wireless communications and more specifically to cross-carrier scheduling techniques for wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some examples, a UE may communicate with multiple serving cells of a wireless communications system in a carrier aggregation (CA) configuration. In some examples, a serving cell may transmit a cross-carrier scheduling indication that the UE is to communicate with a different serving cell via a data transmission. For example, the UE may be scheduled to receive a downlink transmission, or transmit an uplink transmission.

SUMMARY

The described techniques relate to improved methods, systems, devices, and apparatuses that support cross-carrier scheduling techniques for wireless communications systems. Generally, the described techniques provide for one or more enhanced cross-carrier scheduling schemes. For example, the described techniques enable a UE to monitor search spaces of a scheduling secondary cell (e.g., user specific search spaces associated with downlink control information (DCI) scheduling communications with another cell) in addition to search spaces of a primary cell (e.g., common search spaces of the primary cell associated with one or more mobility and connectivity functionalities), such as a primary cell of a master cell group, a primary secondary cell of a secondary cell group, etc. Such cross-carrier scheduling schemes may result in efficient communications while enabling various functionalities associated with the primary cell. In some examples, the techniques described herein may also enable the UE to be configured with one or more parameters for monitoring the various search spaces. For example, the UE may be configured with a user specific search space of the scheduling secondary cell and the UE may also be configured with a user specific search space of the primary cell (e.g., the user specific search spaces may correspond to a same search space identifier). The UE may determine an indication of a quantity of decoding candidates configured for the user specific search space of the primary cell and utilize such a parameter to identify one or more sets of decoding candidates to monitor on the secondary cell (e.g., based on a value of a carrier indicator field (CIF). Additionally or alternatively, the UE may be configured to monitor a quantity of search spaces that satisfy (e.g., less than or equal to) a threshold quantity of search spaces (e.g., a threshold based on a UE capability or a pre-configured threshold). In some examples, the user specific search space of the primary cell may be included in the quantity of search spaces. In some other examples, the user specific search space of the primary cell may not be included in the quantity of search spaces.

A method of wireless communications at a UE is described. The method may include identifying that the UE is in communication with a primary cell and a secondary cell in a carrier aggregation configuration, where the primary cell is a cross-carrier scheduled cell and the secondary cell is a cross-carrier scheduling cell, receiving DCI from the secondary cell, where the DCI includes a cross-carrier scheduling indication that a data transmission is scheduled with the primary cell, monitoring a common search space of the primary cell for control information that pertains to communications with the primary cell that is the cross-carrier scheduled cell, and communicating with the primary cell via the data transmission in accordance with at least one of the DCI from the secondary cell and the control information from the common search space of the primary cell.

An apparatus for wireless communications at a UE is described. The apparatus may include a processor, memory coupled with the processor, and instructions stored in the memory. The instructions may be executable by the processor to cause the apparatus to identify that the UE is in communication with a primary cell and a secondary cell in a carrier aggregation configuration, where the primary cell is a cross-carrier scheduled cell and the secondary cell is a cross-carrier scheduling cell, receive DCI from the secondary cell, where the DCI includes a cross-carrier scheduling indication that a data transmission is scheduled with the primary cell, monitor a common search space of the primary cell for control information that pertains to communications with the primary cell that is the cross-carrier scheduled cell, and communicate with the primary cell via the data transmission in accordance with at least one of the DCI from the secondary cell and the control information from the common search space of the primary cell.

Another apparatus for wireless communications at a UE is described. The apparatus may include means for identifying that the UE is in communication with a primary cell and a secondary cell in a carrier aggregation configuration, where the primary cell is a cross-carrier scheduled cell and the secondary cell is a cross-carrier scheduling cell, receiving DCI from the secondary cell, where the DCI includes a cross-carrier scheduling indication that a data transmission is scheduled with the primary cell, monitoring a common search space of the primary cell for control information that pertains to communications with the primary cell that is the cross-carrier scheduled cell, and communicating with the primary cell via the data transmission in accordance with at least one of the DCI from the secondary cell and the control information from the common search space of the primary cell.

A non-transitory computer-readable medium storing code for wireless communications at a UE is described. The code may include instructions executable by a processor to identify that the UE is in communication with a primary cell and a secondary cell in a carrier aggregation configuration, where the primary cell is a cross-carrier scheduled cell and the secondary cell is a cross-carrier scheduling cell, receive DCI from the secondary cell, where the DCI includes a cross-carrier scheduling indication that a data transmission is scheduled with the primary cell, monitor a common search space of the primary cell for control information that pertains to communications with the primary cell that is the cross-carrier scheduled cell, and communicate with the primary cell via the data transmission in accordance with at least one of the DCI from the secondary cell and the control information from the common search space of the primary cell.

Some examples of the method, apparatuses, and non-transitory computer-readable medium described herein may further include operations, features, means, or instructions for identifying a search space identifier associated with a user specific search space of the secondary cell, determining one or more configuration parameters associated with a user specific search space of the primary cell based on the search space identifier, and monitoring a quantity of downlink control channel candidates of the user specific search space of the secondary cell for the DCI, where the quantity of downlink control channel candidates may be based on the one or more configuration parameters.

In some examples of the method, apparatuses, and non-transitory computer-readable medium described herein, the one or more configuration parameters includes a per-aggregation level indication of the quantity of downlink control channel candidates to be monitored.

In some examples of the method, apparatuses, and non-transitory computer-readable medium described herein, the search space identifier associated with the user specific search space of the secondary cell may be the same as a search space identifier associated with the user specific search space of the primary cell.

Some examples of the method, apparatuses, and non-transitory computer-readable medium described herein may further include operations, features, means, or instructions for monitoring a first quantity of downlink control channel candidates in the secondary cell for information associated with the secondary cell, and monitoring a second quantity of downlink control channel candidates in the secondary cell for information associated with the primary cell.

Some examples of the method, apparatuses, and non-transitory computer-readable medium described herein may further include operations, features, means, or instructions for determining the first quantity of downlink control channel candidates based on a CIF corresponding to the secondary cell, and determining the second quantity of downlink control channel candidates based on a CIF corresponding to the primary cell, where the DCI includes both the CIF corresponding to the secondary cell and the CIF corresponding to the primary cell.

Some examples of the method, apparatuses, and non-transitory computer-readable medium described herein may further include operations, features, means, or instructions for identifying a quantity of search spaces that the UE monitors on the primary cell and on the secondary cell, where the quantity of search spaces includes the common search space of the primary cell and a user specific search space of the secondary cell, and determining whether the quantity of search spaces is less than or equal to a maximum quantity of search spaces that the UE may be configured to monitor per bandwidth part.

In some examples of the method, apparatuses, and non-transitory computer-readable medium described herein, the quantity of search spaces includes a user specific search space of the primary cell.

In some examples of the method, apparatuses, and non-transitory computer-readable medium described herein, the quantity of search spaces does not include a user specific search space of the primary cell in the quantity of search spaces.

Some examples of the method, apparatuses, and non-transitory computer-readable medium described herein may further include operations, features, means, or instructions for monitoring one or more downlink control channel candidates of the user specific search space of the secondary cell for the DCI.

Some examples of the method, apparatuses, and non-transitory computer-readable medium described herein may further include operations, features, means, or instructions for identifying a cell radio network temporary identifier (C-RNTI), monitoring the common search space of the primary cell for the control information using the C-RNTI, and monitoring a user specific search space of the secondary cell using the C-RNTI, where receiving the DCI from the secondary cell may be based on monitoring the user specific search space of the secondary cell.

In some examples of the method, apparatuses, and non-transitory computer-readable medium described herein, monitoring the common search space of the primary cell for the control information that pertains to communications with the primary cell may include operations, features, means, or instructions for monitoring a type0 common search space of the primary cell, a type0A common search space of the primary cell, a type1 common search space of the primary cell, a type2 common search space of the primary cell, a type3 common search space of the primary cell, or any combination thereof.

Some examples of the method, apparatuses, and non-transitory computer-readable medium described herein may further include operations, features, means, or instructions for performing one or more connectivity operations or mobility operations based on the control information that pertains to the communications with the primary cell.

In some examples of the method, apparatuses, and non-transitory computer-readable medium described herein, communicating with the primary cell via the data transmission may include operations, features, means, or instructions for receiving a downlink data transmission of the primary cell, transmitting an uplink data transmission of the primary cell, or both.

A method of wireless communications at a base station is described. The method may include identifying that a UE is in communication with a primary cell and a secondary cell in a carrier aggregation configuration, where the primary cell is a cross-carrier scheduled cell and the secondary cell is a cross-carrier scheduling cell, transmitting control information that pertains to communications with the primary cell over a common search space of the primary cell, transmitting DCI over a user specific search space of the secondary cell, where the DCI includes a cross-carrier scheduling indication that a data transmission is scheduled with the primary cell, and communicating with the UE via the data transmission of the primary cell in accordance with at least one of the DCI and the control information that pertains to communications with the primary cell.

An apparatus for wireless communications at a base station is described. The apparatus may include a processor, memory coupled with the processor, and instructions stored in the memory. The instructions may be executable by the processor to cause the apparatus to identify that a UE is in communication with a primary cell and a secondary cell in a carrier aggregation configuration, where the primary cell is a cross-carrier scheduled cell and the secondary cell is a cross-carrier scheduling cell, transmit control information that pertains to communications with the primary cell over a common search space of the primary cell, transmit DCI over a user specific search space of the secondary cell, where the DCI includes a cross-carrier scheduling indication that a data transmission is scheduled with the primary cell, and communicate with the UE via the data transmission of the primary cell in accordance with at least one of the DCI and the control information that pertains to communications with the primary cell.

Another apparatus for wireless communications at a base station is described. The apparatus may include means for identifying that a UE is in communication with a primary cell and a secondary cell in a carrier aggregation configuration, where the primary cell is a cross-carrier scheduled cell and the secondary cell is a cross-carrier scheduling cell, transmitting control information that pertains to communications with the primary cell over a common search space of the primary cell, transmitting DCI over a user specific search space of the secondary cell, where the DCI includes a cross-carrier scheduling indication that a data transmission is scheduled with the primary cell, and communicating with the UE via the data transmission of the primary cell in accordance with at least one of the DCI and the control information that pertains to communications with the primary cell.

A non-transitory computer-readable medium storing code for wireless communications at a base station is described. The code may include instructions executable by a processor to identify that a UE is in communication with a primary cell and a secondary cell in a carrier aggregation configuration, where the primary cell is a cross-carrier scheduled cell and the secondary cell is a cross-carrier scheduling cell, transmit control information that pertains to communications with the primary cell over a common search space of the primary cell, transmit DCI over a user specific search space of the secondary cell, where the DCI includes a cross-carrier scheduling indication that a data transmission is scheduled with the primary cell, and communicate with the UE via the data transmission of the primary cell in accordance with at least one of the DCI and the control information that pertains to communications with the primary cell.

In some examples of the method, apparatuses, and non-transitory computer-readable medium described herein, the common search space of the primary cell includes a type0 common search space of the primary cell, a type0A common search space of the primary cell, a type1 common search space of the primary cell, a type2 common search space of the primary cell, a type3 common search space of the primary cell, or any combination thereof.

Some examples of the method, apparatuses, and non-transitory computer-readable medium described herein may further include operations, features, means, or instructions for configuring a user specific search space of the primary cell with a per-aggregation level indication of a quantity of downlink control channel candidates to be monitored, and transmitting, to the UE, a CIF for the primary cell, a CIF for the secondary cell, or both.

Some examples of the method, apparatuses, and non-transitory computer-readable medium described herein may further include operations, features, means, or instructions for configuring the UE with a search space identifier for a user specific search space of the primary cell and a search space identifier for a user specific search space of the secondary cell. In some examples of the method, apparatuses, and non-transitory computer-readable medium described herein, the search space identifier for the user specific search space of the primary cell may be the same as the search space identifier for the user specific search space of the secondary cell.

Some examples of the method, apparatuses, and non-transitory computer-readable medium described herein may further include operations, features, means, or instructions for receiving an indication of a capability of the UE, and configuring the UE to monitor a quantity of search spaces that satisfy a threshold quantity of search spaces (e.g., a quantity of search spaces that are less than or equal to the threshold quantity of search spaces) for the UE to monitor per bandwidth part based on the capability of the UE, where the quantity of search spaces includes the common search space of the primary cell and a user specific search space of the secondary cell.

In some examples of the method, apparatuses, and non-transitory computer-readable medium described herein, the quantity of search spaces includes a user specific search space of the primary cell.

In some examples of the method, apparatuses, and non-transitory computer-readable medium described herein, the quantity of search spaces does not include a user specific search space of the primary cell.

DETAILED DESCRIPTION

Figure 1:
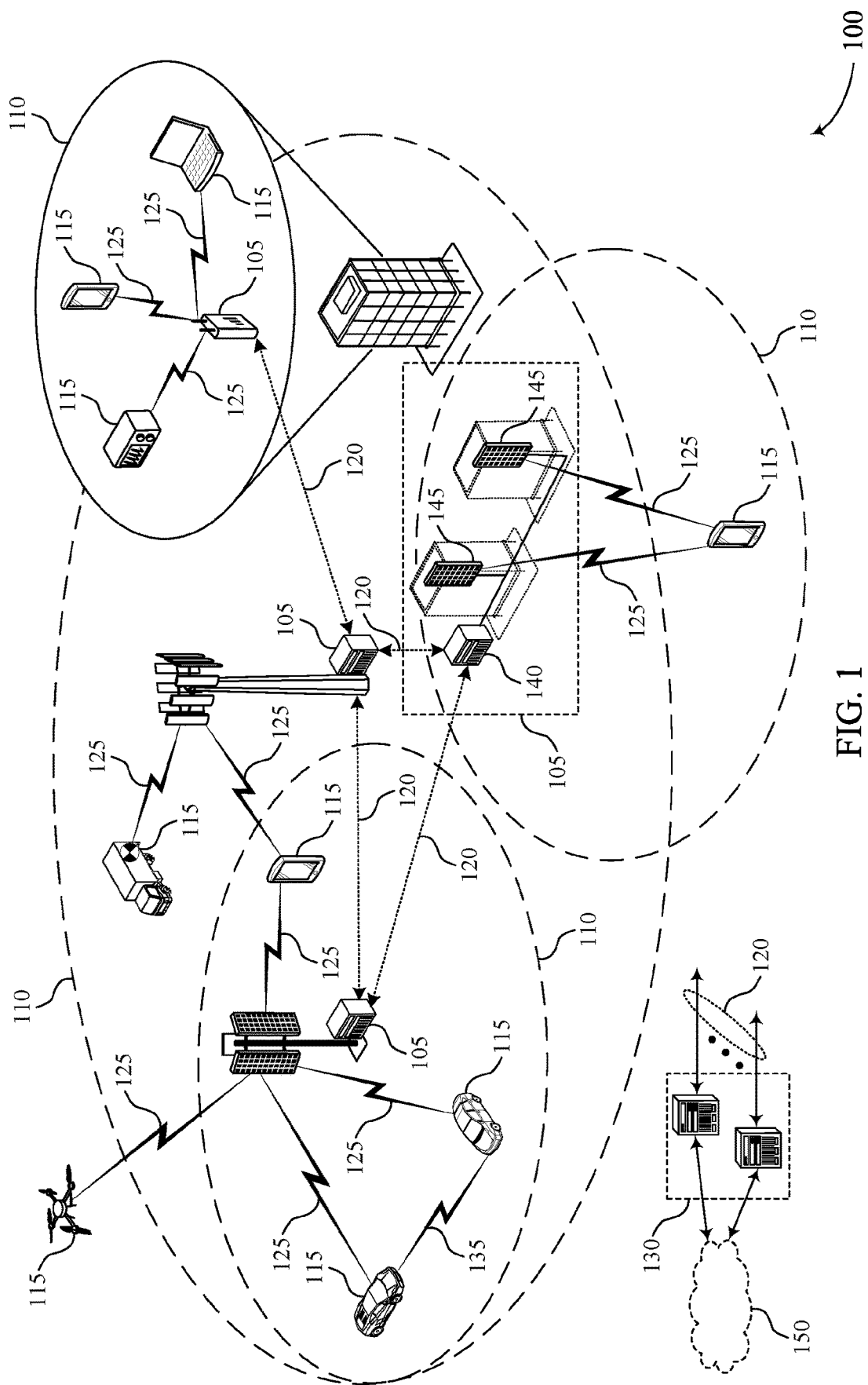
FIGS. 1 and 2 illustrate examples of wireless communications systems that support cross-carrier scheduling techniques for wireless communications systems in accordance with aspects of the present disclosure.

A user equipment (UE) in a wireless communications system may communicate with multiple serving cells (e.g., associated with one or more base stations) in a carrier aggregation (CA) configuration to increase available bandwidth and data rates for the UE. Each serving cell may communicate with the UE on a respective component carrier (CC) in a respective frequency band. Each serving cell may be associated with a radio access technology (RAT) (e.g., a fourth generation (4G) system such as a Long Term Evolution (LTE) system, a fifth generation (5G) system which may be referred to as a New Radio (NR) system, etc.). For example, a UE may communicate with two serving cells in a dual connectivity (DC) scheme (e.g., an NR-DC scheme, an evolved universal mobile telecommunication system terrestrial radio access (E-UTRA) NR (EN)-DC scheme, etc.), where each serving cell may belong to a different RAT or a different cell group within a RAT.

Each serving cell may belong to one or more cell groups, such as a master cell group (MCG), a secondary cell group (SCG), etc. A UE may use radio resources associated with a master node (MN) for communicating with serving cells in an MCG. Similarly, a UE may use radio resources associated with a secondary node (SN) for communicating with serving cells in an SCG. An MCG may include a primary cell (PCell) and one or more secondary cells (SCells). Similarly, an SCG may include a primary secondary cell (PSCell) and one or more SCells. As used herein, a PCell may refer to a PCell of an MCG or a PSCell of an SCG. A UE may establish a connection with the PCell of an MCG (or with the PSCell of an SCG), and then establish connections with SCells to increase radio resources for communicating with a cell group.

Cells may transmit control information in a control region such as a control resource set (CORESET) of a system bandwidth. For example, a CORESET may include one or more search spaces (e.g., a common search space (CSS) and/or a UE-specific search space (USS)) for the transmission of common and UE-specific control information, respectively. A UE may monitor decoding candidates (e.g., physical downlink control channel (PDCCH) candidates) of a CSS for control information intended for multiple UEs as well as decoding candidates of a USS for control information designated for the UE.

In some examples, a UE may implement cross-carrier scheduling. For example, the UE may be configured to monitor PDCCH candidates of search spaces on a PCell (e.g., a scheduling cell) for cross-carrier scheduling indications associated with transmissions on an SCell (e.g., a scheduled cell), such as a physical downlink shared channel (PDSCH) transmission, a physical uplink shared channel (PUSCH) transmission, etc. However, conventional techniques for cross-carrier scheduling may be deficient, which may result in reduced efficiency or reduced reliability in wireless communications at the UE.

According to the techniques described herein, a wireless communications system may implement one or more enhanced cross-carrier scheduling schemes. For example, a UE may be configured to monitor one or more search spaces of an SCell (e.g., a scheduling cell) for cross-carrier scheduling indications associated with transmissions on a PCell (e.g., a scheduled cell). As an illustrative example, the UE may monitor PDCCH candidates of a user specific search space of the SCell for downlink control information (DCI) scheduling the UE for communications with the PCell (e.g., in addition to or alternative to communications with the SCell). In order to realize enhanced communications, the UE may also monitor one or more search spaces of the PCell for control information, which may enable the UE to implement one or more functionalities associated with the PCell (e.g., fallback operations, PDCCH ordering configurations, beam failure recovery operations, semi-persistent scheduling or configured grant scheduling activation or deactivation, among other examples of functionalities). For example, the UE may monitor one or more common search spaces of the PCell (e.g., a type0 common search space, a type0A common search space, a type1 common search space, a type2 common search space, a type3 common search space, or any combination thereof) to receive the control information associated with the one or more functionalities.

In some examples, the techniques described herein may also configure the UE with one or more parameters of a CA configuration that supports cross-carrier scheduling from the SCell (e.g., the scheduling cell) to the PCell (e.g., the scheduled cell). For example, the UE may be configured with a user specific search space of the SCell (e.g., to monitor PDCCH candidates for cross-carrier scheduling indications). The UE may determine a search space identifier of a user specific search space of the PCell based on the configured user specific search space of the SCell. For example, the UE may use the same search space identifier for the SCell and the PCell. Additionally or alternatively, the UE may determine one or more parameters of the user specific search space of the PCell (e.g., based on the determined or configured search space identifier). As an example, the UE may determine an indication of a quantity of decoding candidates (e.g., a nrofCandidates parameter) configured for the user specific search space of the PCell, a carrier indicator field (CIF) value corresponding to the PCell, etc. The UE may utilize the one or more parameters to monitor the user specific search space of the SCell, which may reduce signaling overhead of the PCell in the wireless communications system. For example, the UE may determine a first quantity of decoding candidates of the SCell to monitor for information associated with the SCell based on the one or more parameters. The UE may also determine a second quantity of decoding candidates of the SCell to monitor for information associated with the PCell based on the one or more parameters. Additionally or alternatively, the UE may be configured to monitor a quantity of search spaces per bandwidth part per cell that is less than a threshold quantity of search spaces (e.g., a threshold based on a UE capability or a pre-configured threshold). In some examples, the user specific search space of the PCell (e.g., a "dummy" search space that the UE refrains from monitoring) may be included in the quantity of search spaces. In some other examples, the user specific search space of the PCell may not be included in the quantity of search spaces.

Aspects of the disclosure are initially described in the context of wireless communications systems. Aspects of the disclosure are further illustrated by and described with reference to scheduling schemes, process flows, apparatus diagrams, system diagrams, and flowcharts that relate to cross-carrier scheduling techniques for wireless communications systems.

FIG. 1 illustrates an example of a wireless communications system 100 that supports cross-carrier scheduling techniques for wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an E-UTRA absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, a base station 105 may include one or more wireless nodes. For example, a base station 105 may include a wireless node for the PCell, a wireless node for the SCell, a wireless node from a PSCell, etc. Additionally or alternatively, the wireless nodes may be distributed among different base stations. For example, the PCell may correspond to a wireless node of a first base station 105 and the SCell may correspond to a wireless node of a different base station 105.

The various devices in the wireless communications system 100 may support one or more cross-carrier scheduling schemes as described herein. For example, a UE 115 may monitor search spaces of a scheduling SCell (e.g., user specific search spaces associated with DCI) in addition to search spaces of a scheduled PCell (e.g., common search spaces of the PCell associated with one or more mobility and connectivity functionalities). Such cross-carrier scheduling schemes may result in efficient communications while enabling various functionalities associated with the primary cell. In some examples, the techniques described herein may also enable the UE 115 to be configured (e.g., by one or more base stations 105) with one or more parameters for monitoring various search spaces. For example, the UE 115 may be configured with a quantity of search spaces to monitor (e.g., a quantity of search spaces that includes or excludes a user specific search space of the PCell) that satisfies a threshold (e.g., is less than or equal to), such as a preconfigured threshold or a threshold associated with a capability of the UE. Additionally or alternatively, the UE 115 may be configured with a user specific search space of the SCell and the UE 115 may also be configured with a user specific search space of the PCell (e.g., the user specific search spaces may correspond to a same search space identifier). The UE 115 may determine an indication of a quantity of decoding candidates configured for the user specific search space of the PCell and utilize such a parameter to identify one or more sets of decoding candidates to monitor on the SCell (e.g., based on a CIF value).

Figure 2:
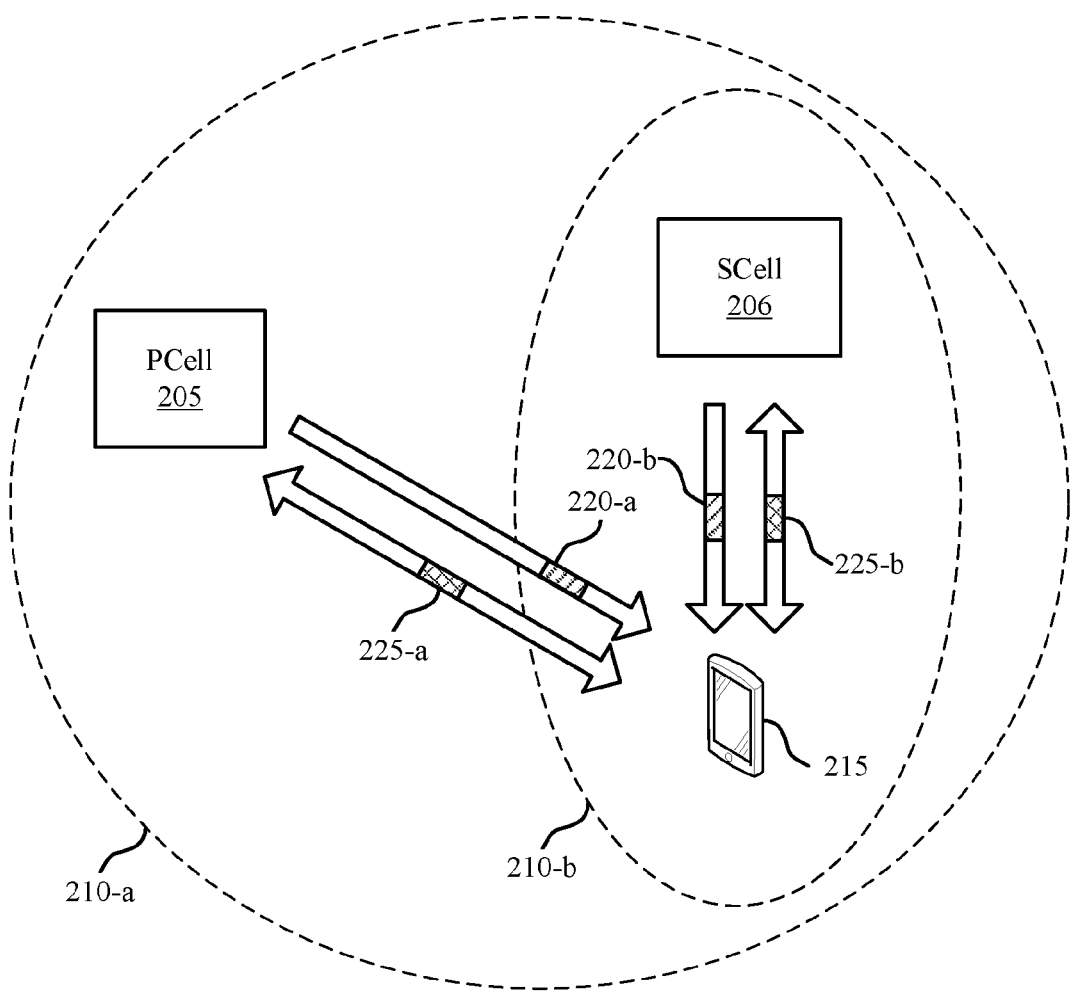
Figure 2:
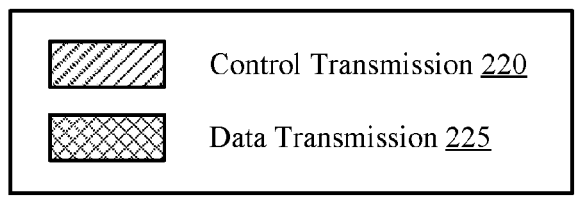

FIG. 2 illustrates an example of a wireless communications system 200 that supports cross-carrier scheduling techniques for wireless communications systems in accordance with aspects of the present disclosure. In some examples, the wireless communications system 200 may implement aspects of wireless communications system 100. For example, the wireless communications system 200 may include a UE 215, which may be an example of a UE 115 described with reference to FIG. 1. The wireless communications system 200 may also include a PCell 205 and an SCell 206, where the PCell 205 and the SCell 206 may be associated with one or more base stations 105 as described herein. Generally, the wireless communications system 200 may illustrate an example of cross-carrier scheduling between PCell 205 and SCell 206 in accordance with the techniques described herein.

In the wireless communications system 200, the PCell 205 may act as a serving cell for a geographic coverage area 210-a, and the SCell 206 may act as a serving cell for a geographic coverage area 210-b. The PCell 205 and the SCell 206 may establish communications with the UE 215. For example, the PCell 205 and the SCell 206 may transmit control transmissions 220 to the UE 215. The UE 215 may communicate data transmissions 225 (e.g., PDSCH transmissions, PUSCH transmissions, etc.) with the PCell 205 or the SCell 206. As illustrated in FIG. 2, the UE 215 may communicate concurrently with the PCell 205 and the SCell 206, for example in a CA configuration. The UE 215 may monitor PDCCH candidates of one or more search spaces on the PCell 205 and of one or more search spaces on the SCell 206.

The wireless communications system 200 may implement cross-carrier scheduling as described herein. In some examples, the PCell 205 may be an example of a scheduling cell and the SCell 206 may be an example of a scheduled cell. For example, the PCell 205 may schedule the UE 215 for communications with the SCell 206. In such examples, the PCell 205 may transmit a control transmission 220-a to the UE 215. The control transmission 220-a may indicate a data transmission 225-b from the SCell 206 to the UE 215. For instance, the control transmission 220-a may include DCI (e.g., a DCI format) that indicates resources reserved for the data transmission 225-b. The UE 215 may monitor a CORESET corresponding to the PCell 205 for the control transmission 220-a. For example, the UE 215 may monitor one or more user specific search spaces of the PCell 205 for the control transmission 220-a (e.g., monitor a set of PDCCH control candidates of a user specific search space for DCI). The UE 215 may identify that the control transmission 220-a includes cross-carrier scheduling information based on one or more parameters of the DCI. For example, the DCI may include a CIF indicating a cell corresponding to the scheduled data transmission 225-b (e.g., a CIF value of 1 for the SCell 206 and a CIF value of 0 for the PCell 205, or vice versa).

Additionally or alternatively, the UE 215 may be configured to monitor one or more common search spaces of the PCell 205 for other control information (e.g., common control information associated with a set of UEs 115 in communication with the PCell 205). For example, the UE 215 may monitor a set of PDCCH control candidates included in each common search space for control information associated with one or more functionalities, such as mobility and/or connectivity functionalities (e.g., fallback operations, PDCCH ordering configurations, beam failure recovery operations, semi-persistent scheduling or configured grant scheduling activation or deactivation, etc.). Such common search spaces may include a type0 common search space, a type0A common search space, a type1 common search space, a type2 common search space, a type3 common search space, or any combination thereof.

The techniques described herein may provide for enhanced cross-carrier scheduling. For example, the SCell 206 may be an example of a scheduling cell and the PCell 205 may be an example of a scheduled cell. Such examples may realize one or more advantages. For example, the PCell 205 may be an example of an NR dynamic spectrum sharing (DSS) cell and the SCell 206 may be an example of a non-DSS cell. In such cases, the PCell 205 may serve a relatively higher number of devices than the SCell 206 and increased resource utilization, reduced latency, and efficient communications may be implemented by providing scheduling at the SCell 206 for the UE 215. However, the UE 215 may fail to monitor PDCCH candidates of search spaces on the PCell 205 because the UE 215 may expect to receive control information from the SCell 206. As a result, the UE 215 may miss control information associated with operations configured by the PCell 205, such as connectivity or mobility functionalities. Missing control information on the PCell 205 may accordingly result in reduced efficiency or reduced reliability in wireless communications at the UE 215.

Accordingly, the UE 215 may be configured to jointly monitor one or more common search spaces of the PCell 205 and one or more user specific search spaces of the SCell 206. For example, the UE 215 may monitor a user specific search space of the SCell 206 for cross-carrier scheduling information (e.g., DCI of a control transmission 220-b indicating a data transmission 225-a with the PCell 205) and the UE 215 may also monitor a common search space of the PCell 205 for other control information (e.g., control information associated with one or more functionalities supported by the PCell 205).

In some examples, the UE 215 may determine one or more parameters of a CA configuration that supports cross-carrier scheduling from the SCell 206 (e.g., the scheduling cell) to the PCell 205 (e.g., the scheduled cell). For example, the UE 215 may be configured with a user specific search space of the SCell 206 (e.g., to monitor PDCCH candidates for a control transmission 220-b). The UE 215 may determine a search space identifier of a user specific search space of the PCell 205 based on the configured user specific search space of the SCell 206. For example, the UE 215 may use the same search space identifier for the SCell 206 and the PCell 205. The UE 215 may determine one or more parameters of the user specific search space of the PCell 205 based on the determined or configured search space identifier. As an example, the UE 215 may determine an indication of a quantity of decoding candidates (e.g., a nrofCandidates parameter) configured for the user specific search space of the PCell 205, a CIF value corresponding to the PCell 205, etc. The UE 215 may utilize the one or more parameters to monitor the user specific search space of the SCell 206, which may reduce signaling overhead in the wireless communications system (e.g., the SCell 206 may refrain from transmitting the one or more parameters of the configured user specific search space of the PCell 205). For example, the UE 215 may determine various quantities of decoding candidates of the SCell 206 to monitor for information associated with the SCell 206 and/or the PCell 205 based on the one or more parameters.

Additionally or alternatively, the UE 215 may be configured to monitor a quantity of search spaces per bandwidth part per cell that is less than a threshold quantity of search spaces (e.g., a threshold based on a UE capability or a pre-configured threshold). In some examples, the user specific search space of the PCell 205 (e.g., a "dummy" search space that the UE 215 may refrain from monitoring) may be included in the quantity of search spaces. In such examples, by including the user specific search space of the PCell 205 in the quantity of search spaces, the UE 215 may not need to distinguish whether or not a search space is the user specific search space of the PCell 205, which may result in a simplified UE process (e.g., a reduced processing overhead at the UE 215). In some other examples, the user specific search space of the PCell 205 may not be included in the quantity of search spaces. In such examples, excluding the user specific search space of the PCell 205 in the quantity of search spaces may result in one or more advantages. For example, the search space that the UE 215 may refrain from monitoring (e.g., the user specific search space of the PCell 205) may not be counted (e.g., considered a search space of a threshold number of search spaces), such that the quantity of search spaces that the UE 215 monitors may be relatively higher.

Figure 3:
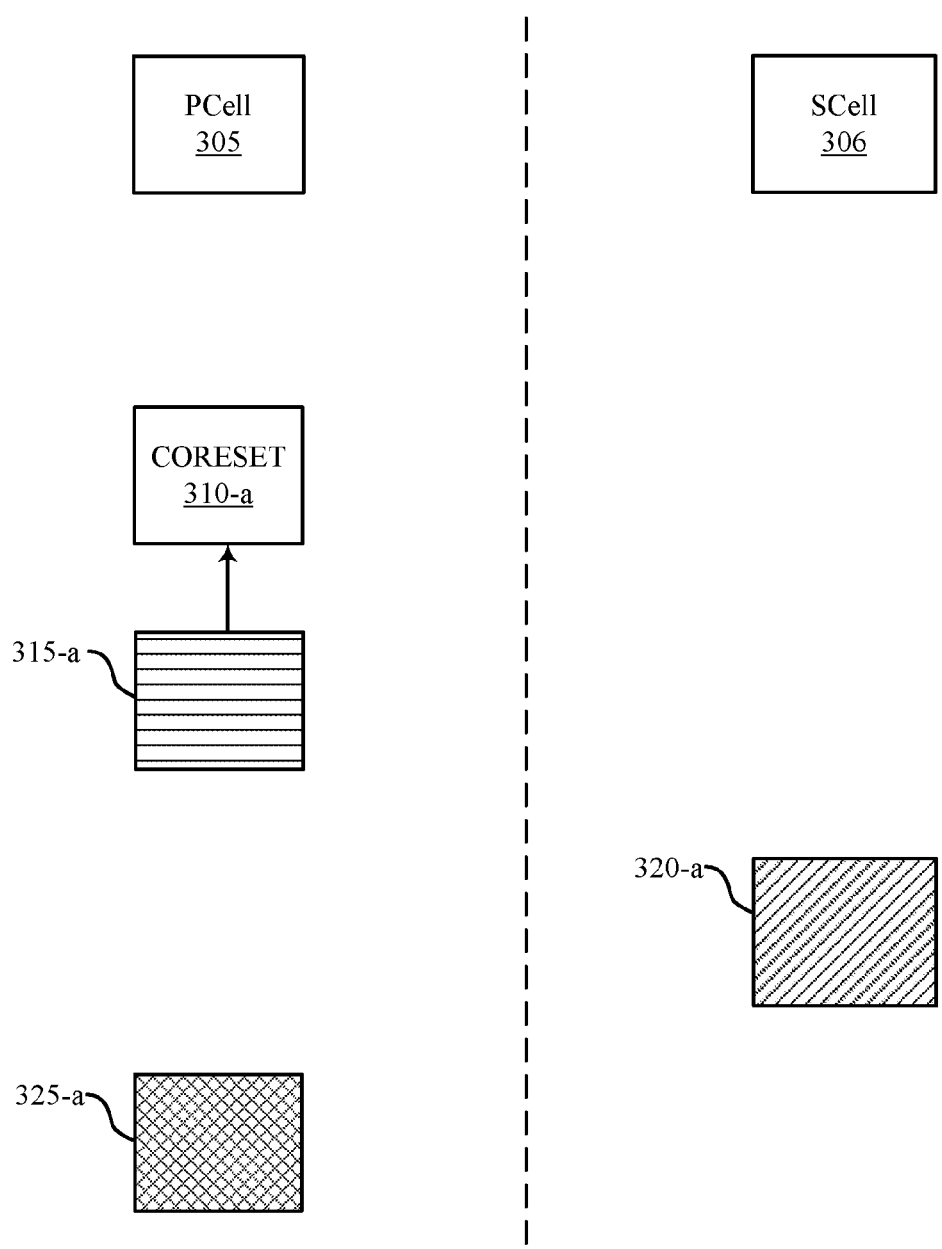
FIGS. 3 and 4 illustrate examples of scheduling schemes that supports cross-carrier scheduling techniques for wireless communications systems in accordance with aspects of the present disclosure.

FIG. 3 illustrates an example of a scheduling scheme 300 that supports cross-carrier scheduling techniques for wireless communications systems in accordance with aspects of the present disclosure. In some examples, the scheduling scheme 300 may implement aspects of wireless communications systems 100 and 200. For example, the scheduling scheme 300 may be associated with communications between a PCell 305, an SCell 306, and a UE, which may be examples of corresponding devices and communications described with reference to FIGS. 1 and 2.

The UE may establish communications with the PCell 305. The PCell 305 may be an example of a PCell of an MCG, a PSCell of a SCG, or any other example of a cell that supports primary cell functionalities (e.g., mobility and/or connectivity functionalities). In some cases, the PCell 305 may support DSS communications. The UE may also establish communications with the SCell 306. The SCell 306 may be an example of a SCell of a MCG, a SCG, etc. In some cases, the SCell 306 may not support DSS communications.

As illustrated in the scheduling scheme 300, the SCell 306 may be an example of a scheduling cell and the PCell 305 may be an example of a scheduled cell. For example, a UE may monitor one or more search spaces (e.g., a user specific search space) associated with the SCell 306 for a control transmission 320-a. The control transmission 320-a may include cross-carrier scheduling information indicating a data transmission 325-a between the UE and the PCell 305 (e.g., the control transmission 320-a may include DCI, such as a CIF, an indication of resources allocated for the data transmission 325-a, among other examples of downlink control information). In some examples, the data transmission 325-a may include an uplink transmission from the UE to the PCell 305 (e.g., a PUSCH transmission), a downlink transmission from the PCell 305 to the UE (e.g., a PDSCH transmission), or both, among other examples of communications.

The UE may be configured to monitor one or more search spaces of the CORESET 310-a. The CORESET 310-a may be associated with the PCell 305 and may include one or more common search spaces 315 for a set of UEs in communication with the PCell 305 and/or user specific search spaces for the UE. As an illustrative example, the UE may be configured to monitor the common search space 315-a for control information associated with the PCell 305 (e.g., control information that pertains to the data transmission 325, control information associated with one or more functionalities of the PCell 305 such as mobility and/or connectivity functionalities, common control information intended for a plurality of UEs, among other examples of control information associated with the PCell 305).

The UE may be configured, by the PCell 305, to monitor the one or more search spaces (e.g., the common search space 315-a) of the PCell 305. In some examples, the UE may be configured with an indication to "mirror" a search space configuration of the scheduling cell (e.g., the SCell 306) in order to determine a search space configuration of the scheduled cell (e.g., the PCell 305). Additionally or alternatively, one or more optional fields of control signaling (e.g., PDCCH configuration signaling) indicating the search space configuration of the PCell may be valid (e.g., may be considered an exception to the "mirrored" search space configuration). For example, the UE may refrain from referring to at least a portion of a search space configuration in a PDCCH configuration of the SCell 306. In such an example, the UE may be configured with a search space configuration in the PDCCH configuration of the PCell 305. The UE may monitor the common search space 315-a of the PCell 305 based on the search space configuration.

In some examples, the common search space 315-a may be an example of a type 3 common search space. For example, the UE may monitor the common search space 315-a on the PCell 305 using a cell-radio network temporary identifier (C-RNTI) (e.g., a C-RNTI identified as part of a connection procedure or identified based on monitoring the common search space 315-a), which may enable the UE to perform various operations to enhance communications. For example, the UE may perform fallback operations, PDCCH ordering configurations, beam failure recovery operations, semi-persistent scheduling or configured grant scheduling activation or deactivation, among other examples of operations enabled via type 3 common search space information (e.g., information decoded using the C-RNTI).

Additionally or alternatively, the common search space 315-a may be an example of other types of common search spaces. For example, the common search space 315-a may be an example of a type0 common search space, a type0A common search space, a type1 common search space, a type2 common search space, etc. In some cases, the UE may be configured to monitor any combination of one or more common search spaces 315 of the PCell 305 for control information associated with the PCell 305 (or the SCell 306).

Figure 4:
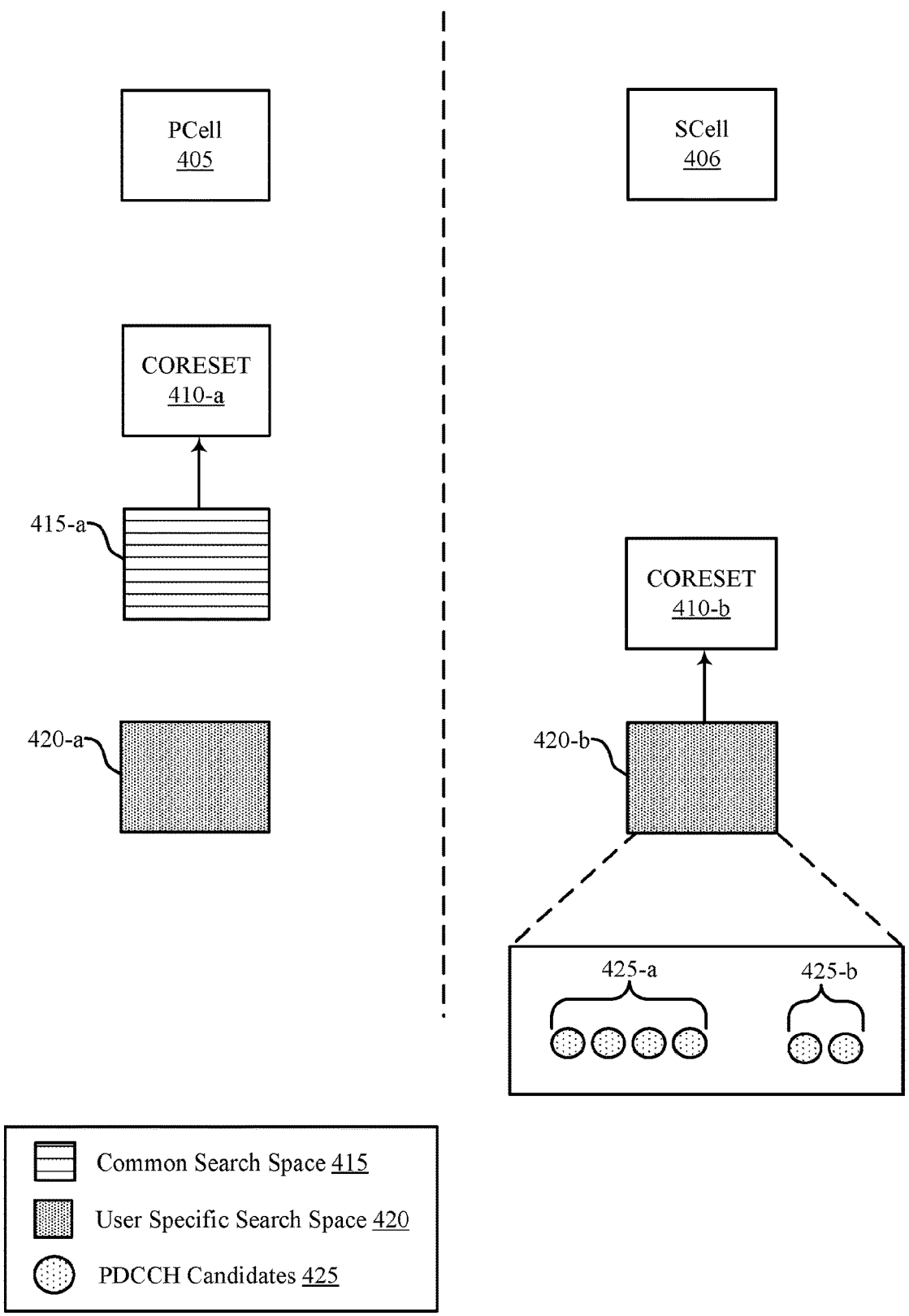

FIG. 4 illustrates an example of a scheduling scheme 400 that supports cross-carrier scheduling techniques for wireless communications systems in accordance with aspects of the present disclosure. In some examples, the scheduling scheme 400 may implement aspects of wireless communications systems 100 and 200. For example, the scheduling scheme 400 may be associated with communications between a PCell 405, an SCell 406, and a UE, which may be examples of corresponding devices and communications described with reference to FIGS. 1 through 3.

As illustrated in the scheduling scheme 400, the SCell 406 may be an example of a scheduling cell and the PCell 405 may be an example of a scheduled cell. A UE may monitor a CORESET 410-b of the SCell 406 for downlink control messages (e.g., DCI scheduling a data transmission between the UE and the PCell 405). For example, the UE may monitor one or more decoding candidates (e.g., PDCCH candidates 425) of one or more user specific search spaces 420, such as the user specific search space 420-b. The UE may also monitor a CORESET 410-a of the PCell 405 for other control information, as described herein with reference to FIGS. 1-3. For example, the UE may monitor a common search space 415-a, which may be an example of the common search space 315-a. By monitoring the CORESET 410-a of the PCell 405, the UE may be provided with one or more functionalities of the PCell 405 (e.g., connectivity and mobility functionalities, among other examples), which may result in more efficient and robust communications.

Additionally or alternatively, the UE may be configured to monitor the user specific search space 420-b in accordance with a CA configuration. For example, the SCell 406 (e.g., the scheduling cell) may configure the UE with one or more parameters associated with the user specific search space 420-b. The one or more parameters may include a search space identifier corresponding to the user specific search space 420-b. The PCell 405 (e.g., the scheduled cell) may configure the UE with one or more parameters associated with the user specific search space 420-a. In some examples, the UE may be configured with the same search space identifier corresponding to the user specific search space 420-b as a search space identifier corresponding to the user specific search space 420-a. The UE may identify one or more CA configuration parameters based on the configuration of the user specific search space 420-a and the configuration of the user specific search space 420-b.

For example, the UE may identify a configuration parameter indicating a quantity of decoding candidates (e.g., a nrofCandidates parameter for each aggregation level) configured for the user specific search space 420-*a* by the PCell 405. In some examples, the PCell 405 may refrain from indicating other configuration parameters of the user specific search space 420. In other words, the configuration of the user specific search space 420 may include one or more parameters (e.g., the nrofCandidates parameter), but may leave other parameters absent, which may result in reduced signaling overhead (e.g., compared to signaling the other parameters that may not be used if the UE refrains from monitoring the user specific search space 420-*a* as described herein).

The UE may also identify other configuration parameters associated with the CA configuration, such as a CIF value corresponding to the SCell 406 (e.g., a CIF value of 1 or 0) and a CIF value corresponding to the PCell 405 (e.g., a CIF value of 1 or 0). As an example, the UE may identify one or both CIF values based on DCI (e.g., unicast DCI intended for the UE, broadcast DCI intended to a set of UEs, etc.). The UE may monitor one or more PDCCH candidates 425 of the user specific search space 420-*b* in accordance with the identified parameters, such as PDCCH candidates 425 of the scheduling cell SCell 406. For example, the UE may monitor a first set of PDCCH candidates 425-*a* based on the configuration parameter indicating a quantity of decoding candidates. In other words, for a CIF value of 0 indicating the PCell 405 and a nrofCandidates parameter, the UE may monitor a first quantity of PDCCH candidates 425 for information corresponding to the PCell 405 (e.g., scheduling information of a data transmission between the UE and the PCell 405). The first quantity may be indicated by the nrofCandidates parameter. Additionally or alternatively, for a CIF value of 1 indicating the SCell 406 and the nrofCandidates parameter, the UE may determine a second quantity of PDCCH candidates 425 to monitor for information corresponding to the SCell 406, such as a second set of PDCCH candidates 425-*b*. By identifying the configuration parameters between cells, the system may realize reduced signaling overhead in the wireless communications system (e.g., the SCell 206 may refrain from transmitting signaling indicating some parameters of the user specific search space 420-*b*).

In some examples, the UE may be configured to monitor a quantity of search spaces that satisfies a threshold. The threshold may be a quantity of search spaces that the UE may monitor based on a capability of the UE (e.g., the UE may indicate the threshold quantity of search spaces that the UE may be capable of monitoring to the PCell 405 and/or the SCell 406) or a pre-configured threshold quantity of search spaces. In some examples, the threshold may be a quantity of search spaces per bandwidth part per cell. Accordingly, the PCell 405 and/or the SCell 406 may configure the UE to monitor a quantity of search spaces that satisfies the threshold. In some examples, the UE may refrain from monitoring the user specific search space 420-*a* (e.g., the user specific search space 420-*a* may be a "dummy" search space configured to signal CA configuration parameters, but there may be no communications of the UE scheduled in the user specific search space 420-*a*). In some cases, the user specific search space 420-*a* may be included in the quantity of search spaces (e.g., the common search space 415-*a* and the user specific search space 420-*a* may be considered as two search spaces of the threshold quantity of search spaces that the UE may monitor). Such examples may ensure that the threshold is satisfied, which may result in reliable communications. In some other cases, the user specific search space 420-*a* may not be included in the quantity of search spaces (e.g., common search space 415-*a* and the user specific search space 420-*a* may be considered as one search space of the threshold quantity of search spaces that the UE may monitor). Such examples may enable enhanced resource utilization and increased system throughput (e.g., the UE may be configured to monitor another search space).

Figure 5:
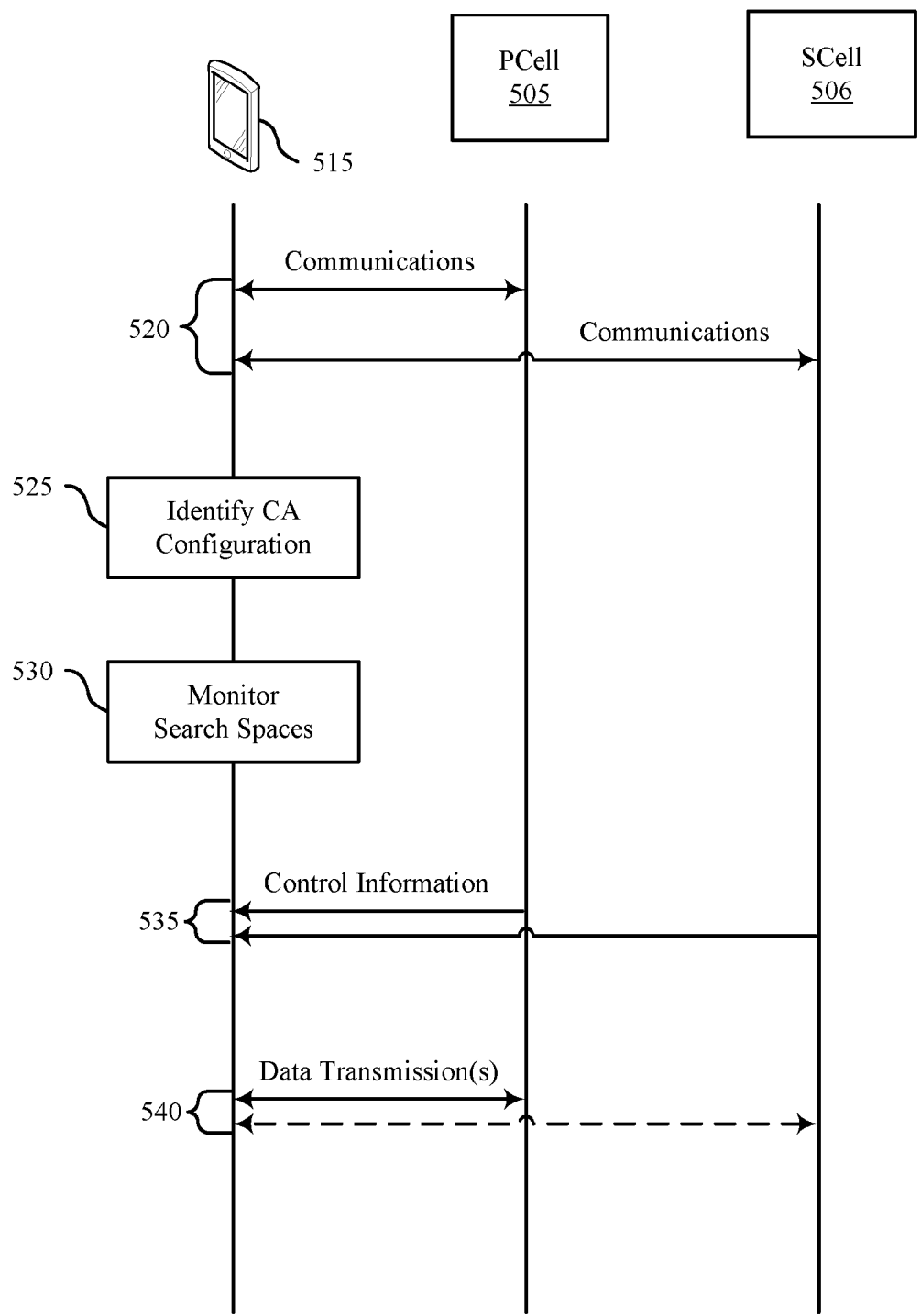
FIG. 5 illustrates an example of a process flow that supports cross-carrier scheduling techniques for wireless communications systems in accordance with aspects of the present disclosure.

FIG. 5 illustrates an example of a process flow 500 that supports cross-carrier scheduling techniques for wireless communications systems in accordance with aspects of the present disclosure. In some examples, the process flow 500 may implement aspects of wireless communications systems 100 and 200. For example, the process flow 500 may include example operations associated with one or more of a PCell 505, an SCell 506, or a UE 515, which may be examples of the corresponding devices described with reference to FIGS. 1 and 2. In the following description of the process flow 500, the operations between the PCell 505, the SCell 506, and the UE 515 may be performed in a different order than the example order shown, or the operations performed by the PCell 505, the SCell 506, and the UE 515 may be performed in different orders or at different times. Some operations may also be omitted from the process flow 500, and other operations may be added to the process flow 500. The operations performed by the PCell 505, the SCell 506, and the UE 515 may support improvement to the UE 515 communications operations and, in some examples, may promote improvements to the UE 515 implementation of cross-carrier scheduling, among other benefits.

At 520, the UE 515 may establish communications with the PCell 505 and the SCell 506. The UE 515 may communicate concurrently with the PCell 505 and an SCell 506, for example in a CA configuration. In some examples, at 520 the PCell 505 may configure the UE 515 with parameters of the CA configuration (e.g., parameters of one or more search spaces as described herein). Additionally or alternatively, the SCell 506 may configure the UE 515 with parameters of the CA configuration.

In some examples, at 525 the UE 515 may identify the CA configuration. For example, the UE 515 may identify that the SCell 506 is a scheduling cell and the PCell 505 is a scheduled cell (e.g., cross-carrier scheduling). The UE 515 may also determine one or more configuration parameters of the CA configuration as described herein with reference to FIGS. 1-4. For instance, the UE 515 may identify a quantity of PDCCH candidates parameter, one or more CIF parameters, etc.

At 530, the UE 515 may monitor search spaces of the PCell 505 and the SCell 506 for control information (e.g., based on the identified CA configuration). For example, the UE 515 may monitor PDCCH candidates of one or more search spaces on the PCell 505 (e.g., a common search space) and one or more search spaces on the SCell 506 (e.g., a user specific search space) according to the CA configuration. Additionally at 530, the PCell 505 and the SCell 506 may determine which PDCCH candidates to use for transmitting control information to the UE 515.

At 535, the UE 515 may receive control information from the PCell 505 and the SCell 506. For example, the PCell 505 may transmit control information via a common search space (e.g., control information pertaining to communications at 540, one or more mobility and/or connectivity operations, etc.) and the SCell 506 may transmit DCI via a user specific search space (e.g., a cross-carrier scheduling indication of communications at 540).

At 540, the UE 515 may communicate with the PCell 505 via the scheduled data transmission in accordance with the received control information at 535. In some examples, the UE 515 may communicate with the SCell 506 via the second data transmission in accordance with the received control information. In some examples, the data transmissions may include PDSCH transmissions, PUSCH transmissions, among other types of communications.

Figure 6:
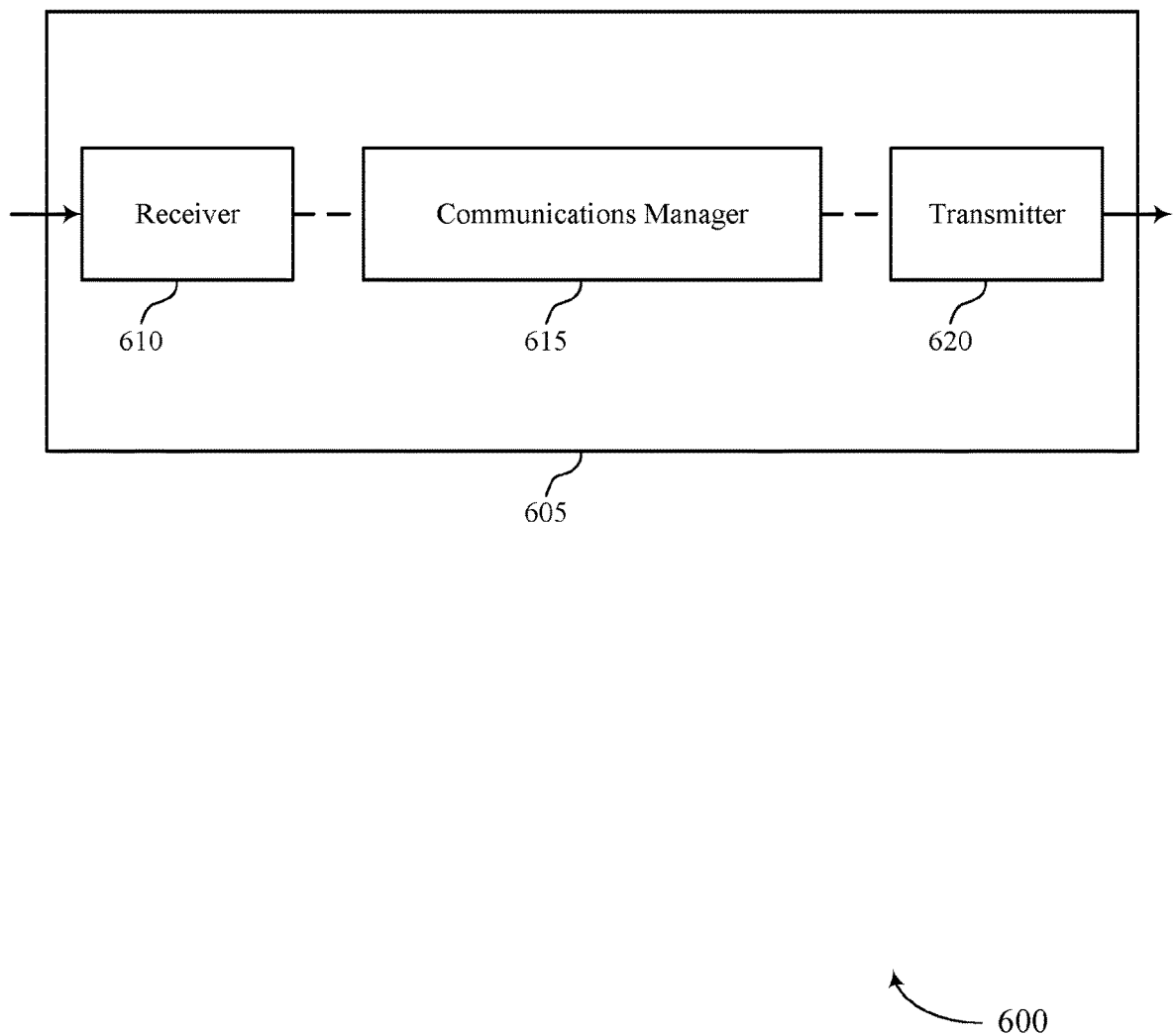
FIGS. 6 and 7 show block diagrams of devices that support cross-carrier scheduling techniques for wireless communications systems in accordance with aspects of the present disclosure.

FIG. 6 shows a block diagram 600 of a device 605 that supports cross-carrier scheduling techniques for wireless communications systems in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to cross-carrier scheduling techniques for wireless communications systems, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify that the UE is in communication with a primary cell and a secondary cell in a carrier aggregation configuration, where the primary cell is a cross-carrier scheduled cell and the secondary cell is a cross-carrier scheduling cell, receive downlink control information from the secondary cell, where the downlink control information includes a cross-carrier scheduling indication that a data transmission is scheduled with the primary cell, monitor a common search space of the primary cell for control information that pertains to communications with the primary cell that is the cross-carrier scheduled cell, and communicate with the primary cell via the data transmission in accordance with at least one of the downlink control information from the secondary cell and the control information from the common search space of the primary cell. The communications manager 615 may be an example of aspects of the communications manager 910 described herein.

The communications manager 615 as described herein may be implemented to realize one or more potential advantages. One implementation may enable the device 605 to increase resource utilization and decrease latency by receiving control information over various service cells (e.g., a PCell and an SCell) in a CA configuration. For example, the device 605 may receive DCI from a SCell scheduling communications on a PCell, while maintaining various functionalities of the PCell via control information transmitted over a common search space of the PCell.

A processor of the device 605 (e.g., controlling the receiver 610, the communications manager 615, or the transmitter 620) may also realize one or more potential advantages. For example, the processor of the device 605 may identify parameters of a user specific search space of a scheduling cell (e.g., an SCell) based on a configuration of a user specific search space on a scheduled cell (e.g., a PCell), which may reduce power consumption and signaling overhead associated with configuring the device 605 with a CA configuration.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
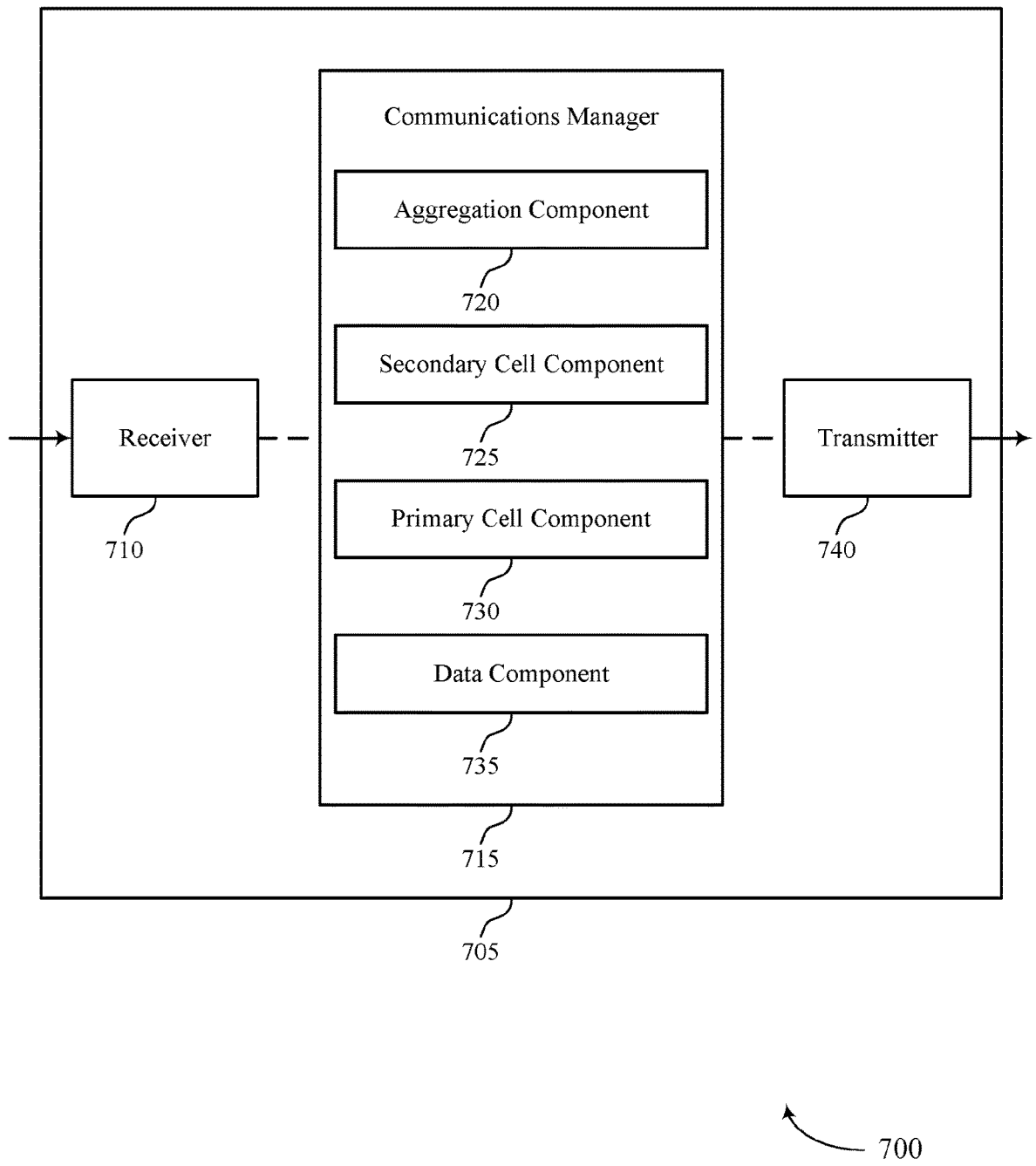

FIG. 7 shows a block diagram 700 of a device 705 that supports cross-carrier scheduling techniques for wireless communications systems in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to cross-carrier scheduling techniques for wireless communications systems, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an aggregation component 720, a secondary cell component 725, a primary cell component 730, and a data component 735. The communications manager 715 may be an example of aspects of the communications manager 910 described herein.

The aggregation component 720 may identify that the UE is in communication with a primary cell and a secondary cell in a carrier aggregation configuration, where the primary cell is a cross-carrier scheduled cell and the secondary cell is a cross-carrier scheduling cell.

The secondary cell component 725 may receive downlink control information from the secondary cell, where the downlink control information includes a cross-carrier scheduling indication that a data transmission is scheduled with the primary cell.

The primary cell component 730 may monitor a common search space of the primary cell for control information that pertains to communications with the primary cell that is the cross-carrier scheduled cell.

The data component 735 may communicate with the primary cell via the data transmission in accordance with at least one of the downlink control information from the secondary cell and the control information from the common search space of the primary cell.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
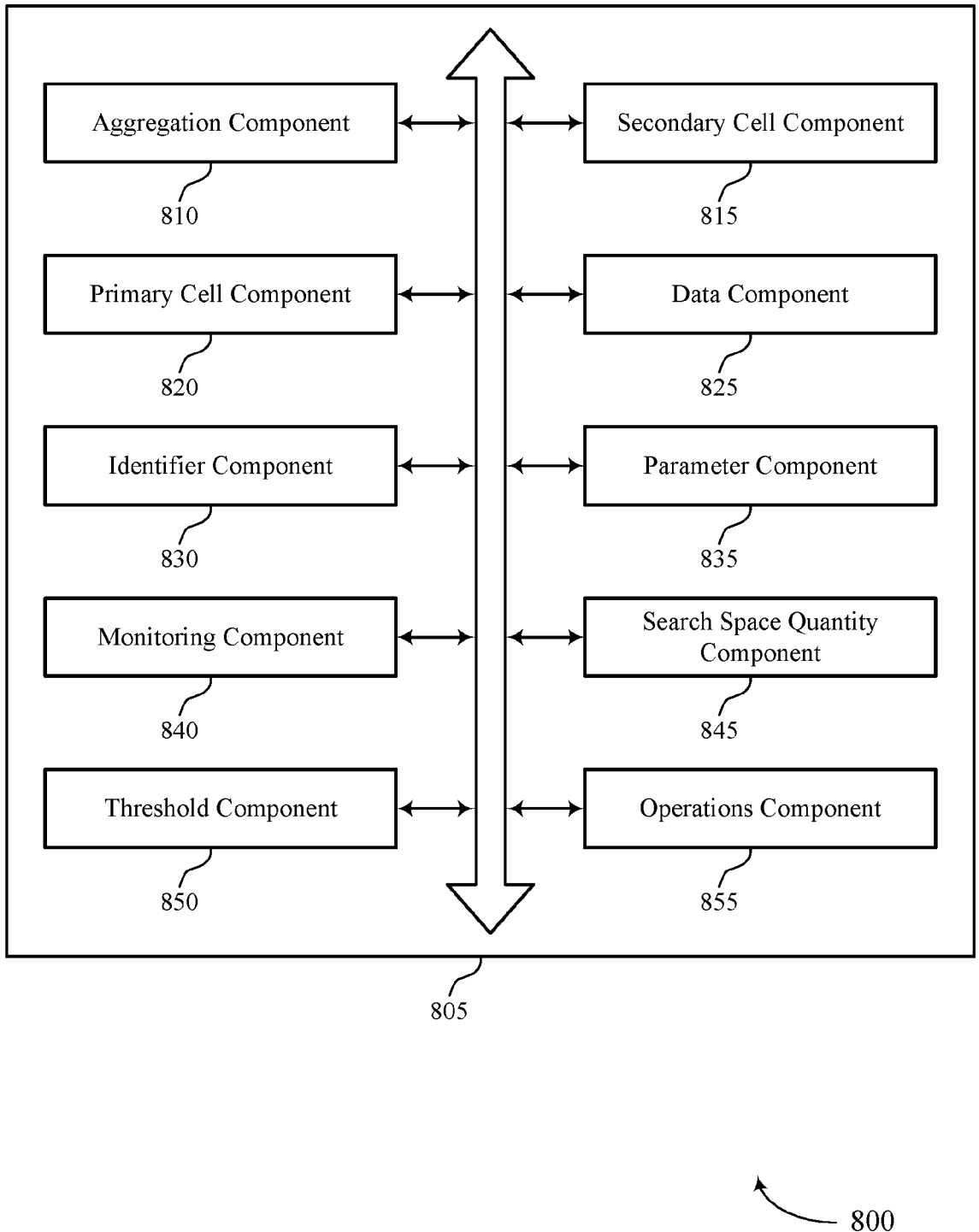
FIG. 8 shows a block diagram of a communications manager that supports cross-carrier scheduling techniques for wireless communications systems in accordance with aspects of the present disclosure.

FIG. 8 shows a block diagram 800 of a communications manager 805 that supports cross-carrier scheduling techniques for wireless communications systems in accordance with aspects of the present disclosure. The communications manager 805 may be an example of aspects of a communications manager 615, a communications manager 715, or a communications manager 910 described herein. The communications manager 805 may include an aggregation component 810, a secondary cell component 815, a primary cell component 820, a data component 825, an identifier component 830, a parameter component 835, a monitoring component 840, a search space quantity component 845, a threshold component 850, and an operations component 855. Each of these modules may communicate, directly or indirectly, with one another (e.g., via one or more buses).

The aggregation component 810 may identify that the UE is in communication with a primary cell and a secondary cell in a carrier aggregation configuration, where the primary cell is a cross-carrier scheduled cell and the secondary cell is a cross-carrier scheduling cell.

The secondary cell component 815 may receive downlink control information from the secondary cell, where the downlink control information includes a cross-carrier scheduling indication that a data transmission is scheduled with the primary cell.

The primary cell component 820 may monitor a common search space of the primary cell for control information that pertains to communications with the primary cell that is the cross-carrier scheduled cell.

The data component 825 may communicate with the primary cell via the data transmission in accordance with at least one of the downlink control information from the secondary cell and the control information from the common search space of the primary cell.

In some examples, the data component 825 may receive a downlink data transmission of the primary cell, transmitting an uplink data transmission of the primary cell, or both.

The identifier component 830 may identify a search space identifier associated with a user specific search space of the secondary cell.

In some examples, the identifier component 830 may identify a cell radio network temporary identifier based on monitoring the common search space of the primary cell for the control information. In some cases, the search space identifier associated with the user specific search space of the secondary cell is the same as a search space identifier associated with the user specific search space of the primary cell.

The parameter component 835 may determine one or more configuration parameters associated with a user specific search space of the primary cell based on the search space identifier. In some cases, the one or more configuration parameters includes a per-aggregation level indication of the quantity of downlink control channel candidates to be monitored.

The monitoring component 840 may monitor a quantity of downlink control channel candidates of the user specific search space of the secondary cell for the downlink control information, where the quantity of downlink control channel candidates is based on the one or more configuration parameters. In some examples, the monitoring component 840 may monitor a first quantity of downlink control channel candidates in the secondary cell for information associated with the secondary cell. In some examples, the monitoring component 840 may monitor a second quantity of downlink control channel candidates in the secondary cell for information associated with the primary cell. In some examples, the monitoring component 840 may determine the first quantity of downlink control channel candidates based on a carrier indicator field corresponding to the secondary cell. In some examples, the monitoring component 840 may determine the second quantity of downlink control channel candidates based on a carrier indicator field corresponding to the primary cell, where the downlink control information includes both the carrier indicator field corresponding to the secondary cell and the carrier indicator field corresponding to the primary cell.

In some examples, the monitoring component 840 may monitor one or more downlink control channel candidates of the user specific search space of the secondary cell for the downlink control information.

In some examples, the monitoring component 840 may monitor a user specific search space of the secondary cell using the cell radio network temporary identifier, where receiving the downlink control information from the secondary cell is based on monitoring the user specific search space of the secondary cell.

In some examples, the monitoring component 840 may monitor a type0 common search space of the primary cell, a type0A common search space of the primary cell, a type1 common search space of the primary cell, a type2 common search space of the primary cell, a type3 common search space of the primary cell, or any combination thereof.

The search space quantity component 845 may identify a quantity of search spaces that the UE monitors on the primary cell and on the secondary cell, where the quantity of search spaces includes the common search space of the primary cell and a user specific search space of the secondary cell. In some cases, the quantity of search spaces does not include a user specific search space of the primary cell. In some cases, the quantity of search spaces includes a user specific search space of the primary cell.

The threshold component 850 may determine whether the quantity of search spaces is less than or equal to a maximum quantity of search spaces that the UE is configured to monitor per bandwidth part.

The operations component 855 may perform one or more connectivity operations or mobility operations based on the control information that pertains to the communications with the primary cell.

Figure 9:
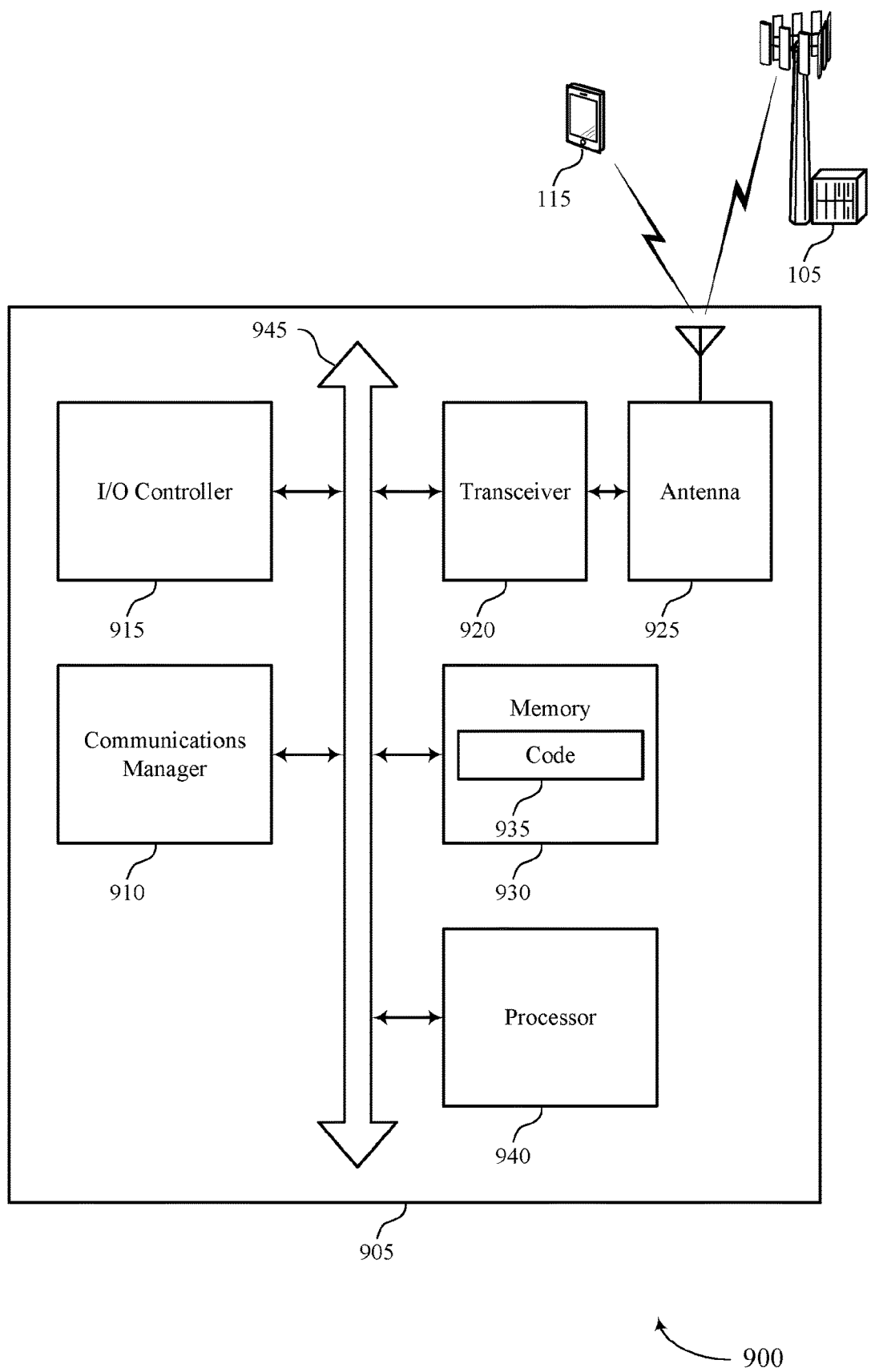
FIG. 9 shows a diagram of a system including a device that supports cross-carrier scheduling techniques for wireless communications systems in accordance with aspects of the present disclosure.

FIG. 9 shows a diagram of a system 900 including a device 905 that supports cross-carrier scheduling techniques for wireless communications systems in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify that the UE is in communication with a primary cell and a secondary cell in a carrier aggregation configuration, where the primary cell is a cross-carrier scheduled cell and the secondary cell is a cross-carrier scheduling cell, receive downlink control information from the secondary cell, where the downlink control information includes a cross-carrier scheduling indication that a data transmission is scheduled with the primary cell, monitor a common search space of the primary cell for control information that pertains to communications with the primary cell, and communicate with the primary cell via the data transmission in accordance with at least one of the downlink control information from the secondary cell and the control information from the common search space of the primary cell.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting cross-carrier scheduling techniques for wireless communications systems).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
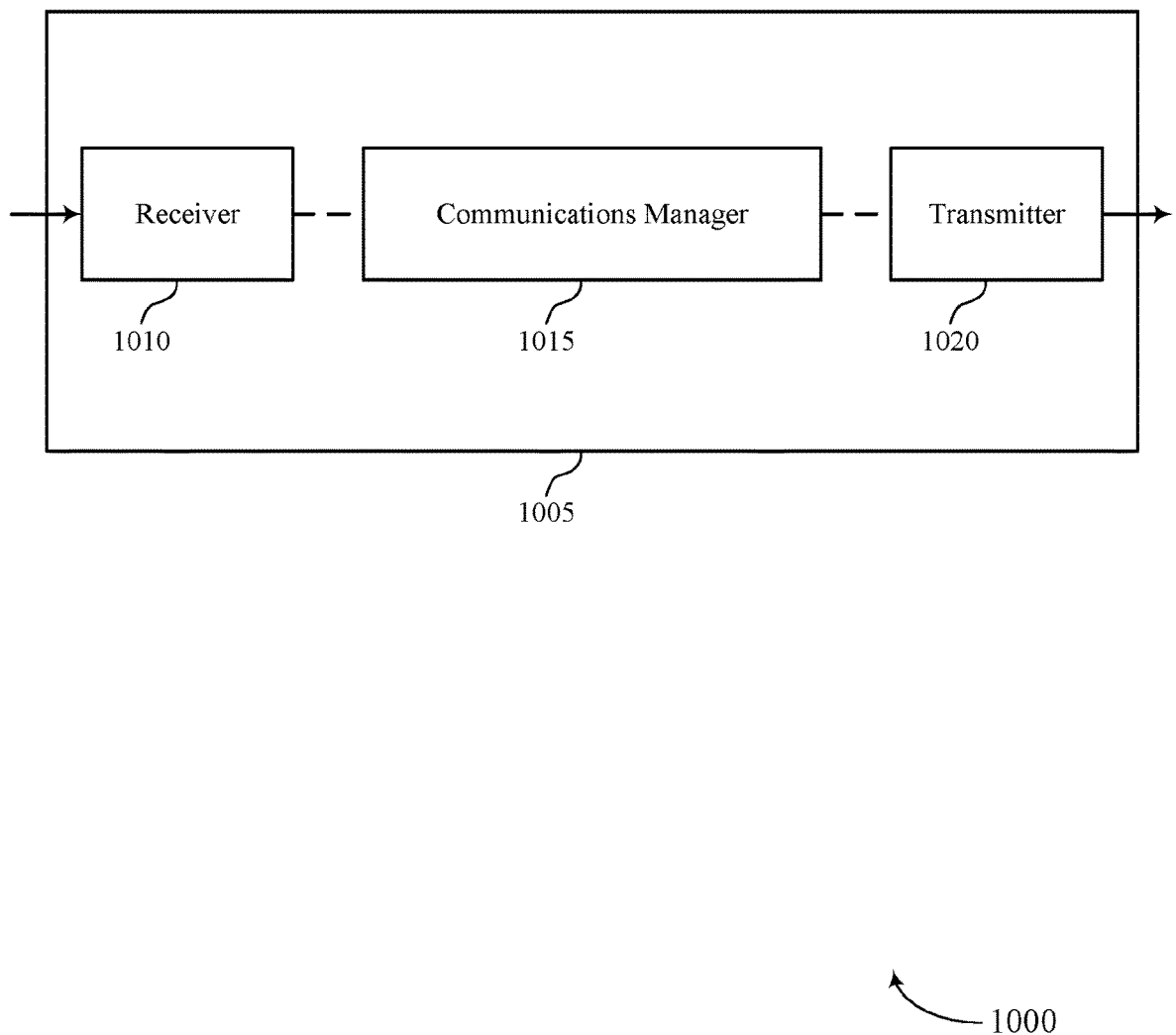
FIGS. 10 and 11 show block diagrams of devices that support cross-carrier scheduling techniques for wireless communications systems in accordance with aspects of the present disclosure.

FIG. 10 shows a block diagram 1000 of a device 1005 that supports cross-carrier scheduling techniques for wireless communications systems in accordance with aspects of the present disclosure. The device 1005 may be an example of aspects of a base station 105 as described herein. For example, the device 1005 may be an example of a primary cell and a secondary cell, although it is to be understood that various operations associated with the primary cell and/or the secondary cell may be performed at separate devices (e.g., different base stations 105). Therefore, in some instances, device 1005 may be representative of a base station that includes both a primary cell and a secondary cell. In other instances, device 1005 may be representative of a base station that is acting as a primary cell, or a base station that is acting as a secondary cell. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to cross-carrier scheduling techniques for wireless communications systems, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify that a UE is in communication with a primary cell and a secondary cell in a carrier aggregation configuration, where the primary cell is a cross-carrier scheduled cell and the secondary cell is a cross-carrier scheduling cell, transmit control information that pertains to communications with the primary cell over a common search space of the primary cell, transmit downlink control information over a user specific search space of the secondary cell, where the downlink control information includes a cross-carrier scheduling indication that a data transmission is scheduled with the primary cell, and communicate with the UE via the data transmission of the primary cell in accordance with at least one of the downlink control information and the control information that pertains to communications with the primary cell. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
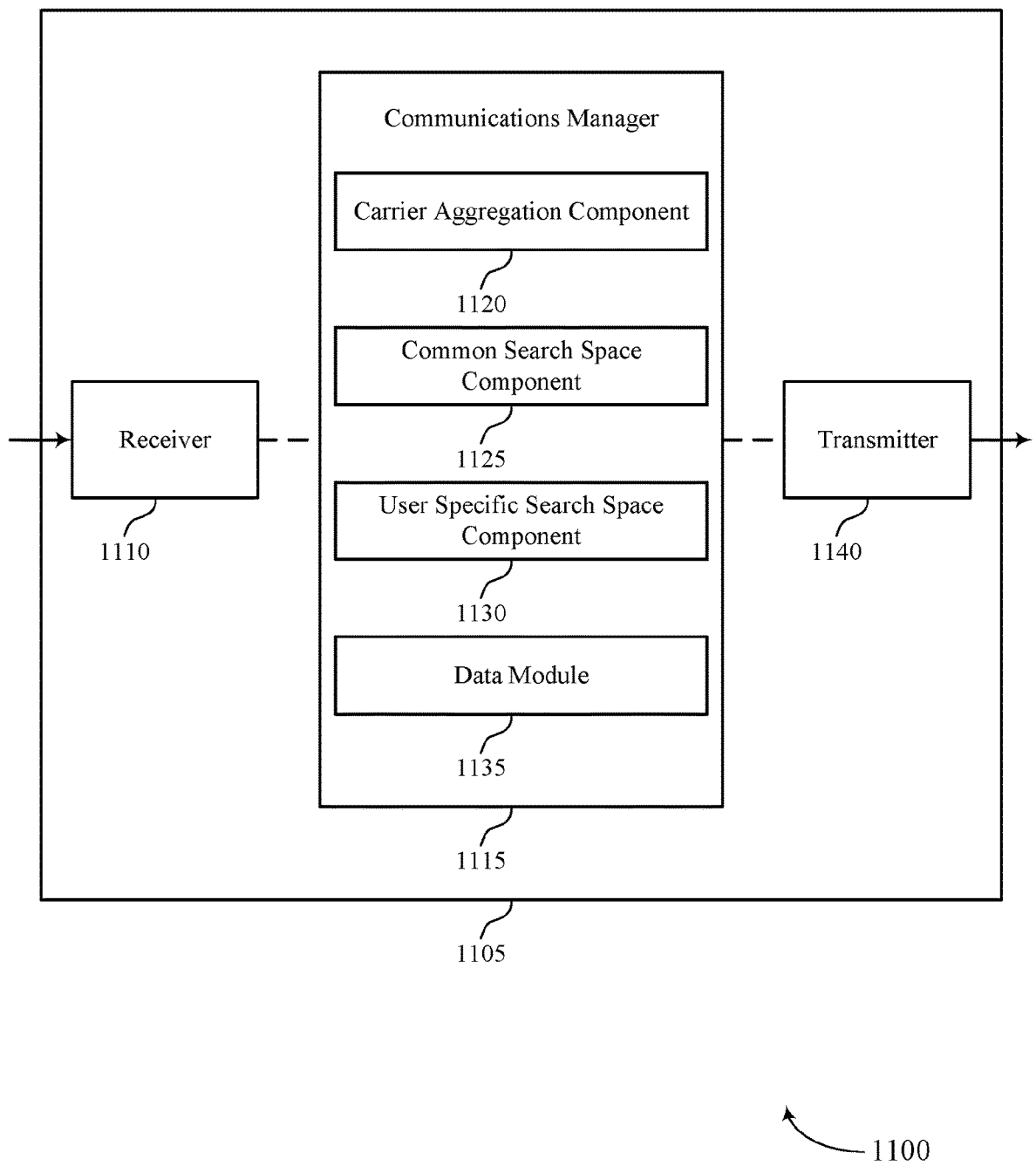

FIG. 11 shows a block diagram 1100 of a device 1105 that supports cross-carrier scheduling techniques for wireless communications systems in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to cross-carrier scheduling techniques for wireless communications systems, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a carrier aggregation component 1120, a common search space component 1125, an user specific search space component 1130, and a data module 1135. The communications manager 1115 may be an example of aspects of the communications manager 1310 described herein.

The carrier aggregation component 1120 may identify that a UE is in communication with a primary cell and a secondary cell in a carrier aggregation configuration, where the primary cell is a cross-carrier scheduled cell and the secondary cell is a cross-carrier scheduling cell.

The common search space component 1125 may transmit control information that pertains to communications with the primary cell over a common search space of the primary cell.

The user specific search space component 1130 may transmit downlink control information over a user specific search space of the secondary cell, where the downlink control information includes a cross-carrier scheduling indication that a data transmission is scheduled with the primary cell.

The data module 1135 may communicate with the UE via the data transmission of the primary cell in accordance with at least one of the downlink control information and the control information that pertains to communications with the primary cell.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
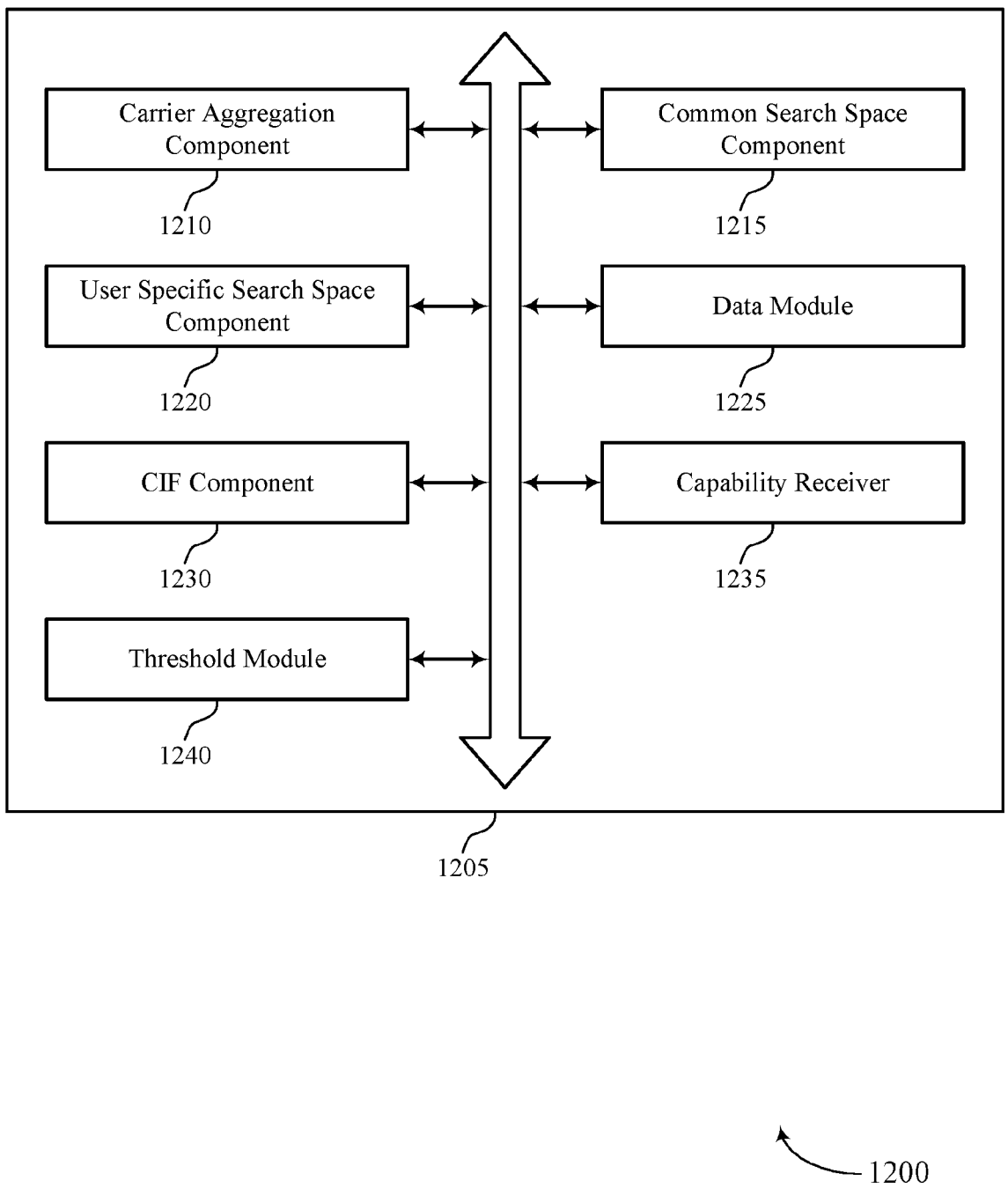
FIG. 12 shows a block diagram of a communications manager that supports cross-carrier scheduling techniques for wireless communications systems in accordance with aspects of the present disclosure.

FIG. 12 shows a block diagram 1200 of a communications manager 1205 that supports cross-carrier scheduling techniques for wireless communications systems in accordance with aspects of the present disclosure. The communications manager 1205 may be an example of aspects of a communications manager 1015, a communications manager 1115, or a communications manager 1310 described herein. The communications manager 1205 may include a carrier aggregation component 1210, a common search space component 1215, an user specific search space component 1220, a data module 1225, a CIF component 1230, a capability receiver 1235, and a threshold module 1240. Each of these modules may communicate, directly or indirectly, with one another (e.g., via one or more buses).

The carrier aggregation component 1210 may identify that a UE is in communication with a primary cell and a secondary cell in a carrier aggregation configuration, where the primary cell is a cross-carrier scheduled cell and the secondary cell is a cross-carrier scheduling cell.

The common search space component 1215 may transmit control information that pertains to communications with the primary cell over a common search space of the primary cell. In some cases, the common search space of the primary cell includes a type0 common search space of the primary cell, a type0A common search space of the primary cell, a type1 common search space of the primary cell, a type2 common search space of the primary cell, a type3 common search space of the primary cell, or any combination thereof.

The user specific search space component 1220 may transmit downlink control information over a user specific search space of the secondary cell, where the downlink control information includes a cross-carrier scheduling indication that a data transmission is scheduled with the primary cell. In some examples, the user specific search space component 1220 may configure a user specific search space of the primary cell with a per-aggregation level indication of a quantity of downlink control channel candidates to be monitored. In some examples, the user specific search space component 1220 may configure the UE with a search space identifier for a user specific search space of the primary cell and a search space identifier for a user specific search space of the secondary cell. In some cases, the search space identifier for the user specific search space of the primary cell is the same as the search space identifier for the user specific search space of the secondary cell.

The data module 1225 may communicate with the UE via the data transmission of the primary cell in accordance with at least one of the downlink control information and the control information that pertains to communications with the primary cell.

The CIF component 1230 may transmit, to the UE, a carrier indicator field for the primary cell, a carrier indicator field for the secondary cell, or both.

The capability receiver 1235 may receive an indication of a capability of the UE.

The threshold module 1240 may configure the UE to monitor a quantity of search spaces that satisfy a threshold quantity of search spaces for the UE to monitor per bandwidth part based on the capability of the UE, where the quantity of search spaces includes the common search space of the primary cell and a user specific search space of the secondary cell. In some cases, the quantity of search spaces includes a user specific search space of the primary cell. In some cases, the quantity of search spaces does not include a user specific search space of the primary cell.

Figure 13:
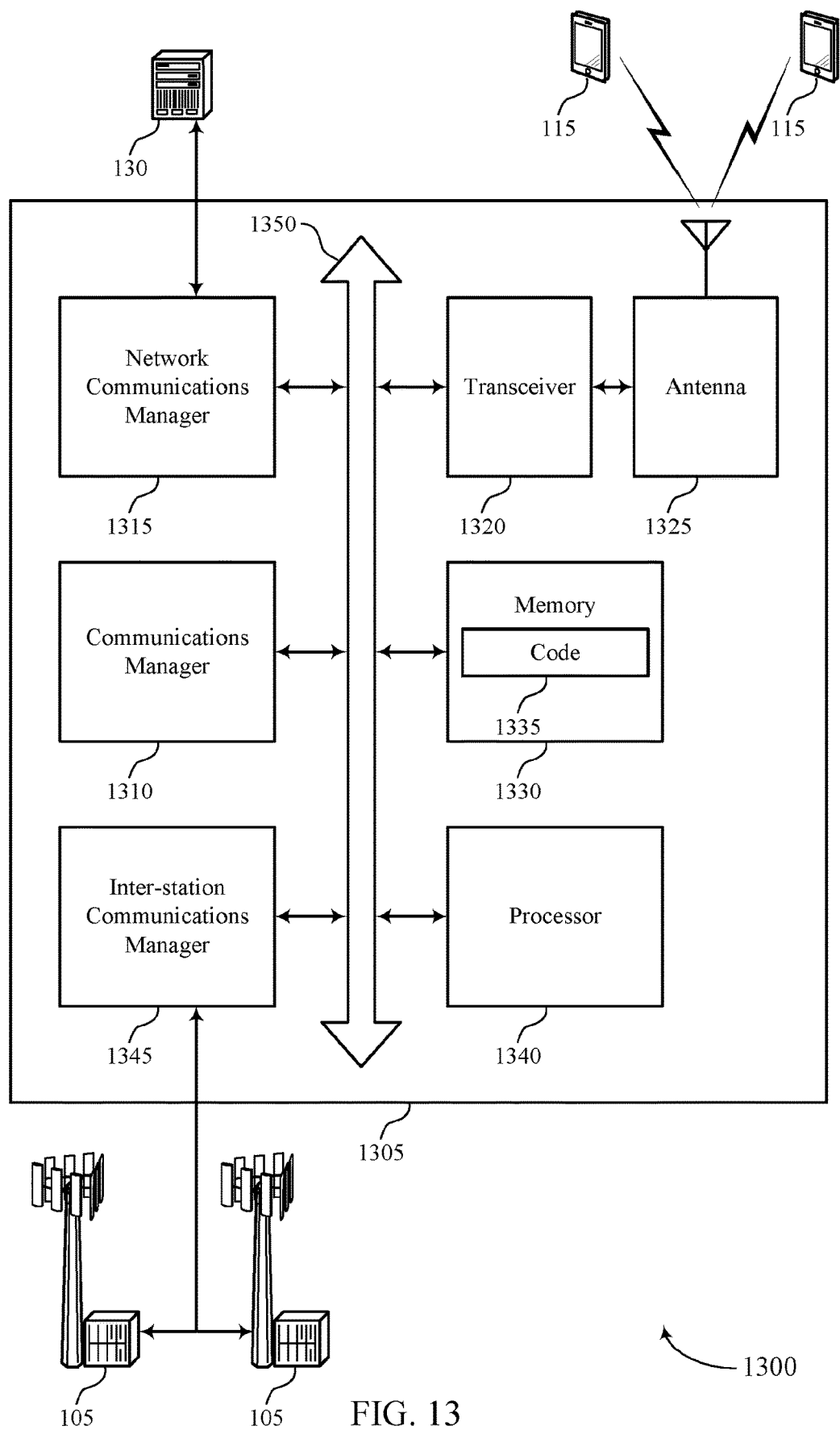
FIG. 13 shows a diagram of a system including a device that supports cross-carrier scheduling techniques for wireless communications systems in accordance with aspects of the present disclosure.

FIG. 13 shows a diagram of a system 1300 including a device 1305 that supports cross-carrier scheduling techniques for wireless communications systems in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify that a UE is in communication with a primary cell and a secondary cell in a carrier aggregation configuration, where the primary cell is a cross-carrier scheduled cell and the secondary cell is a cross-carrier scheduling cell, transmit control information that pertains to communications with the primary cell over a common search space of the primary cell, transmit downlink control information over a user specific search space of the secondary cell, where the downlink control information includes a cross-carrier scheduling indication that a data transmission is scheduled with the primary cell, and communicate with the UE via the data transmission of the primary cell in accordance with at least one of the downlink control information and the control information that pertains to communications with the primary cell.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting cross-carrier scheduling techniques for wireless communications systems).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
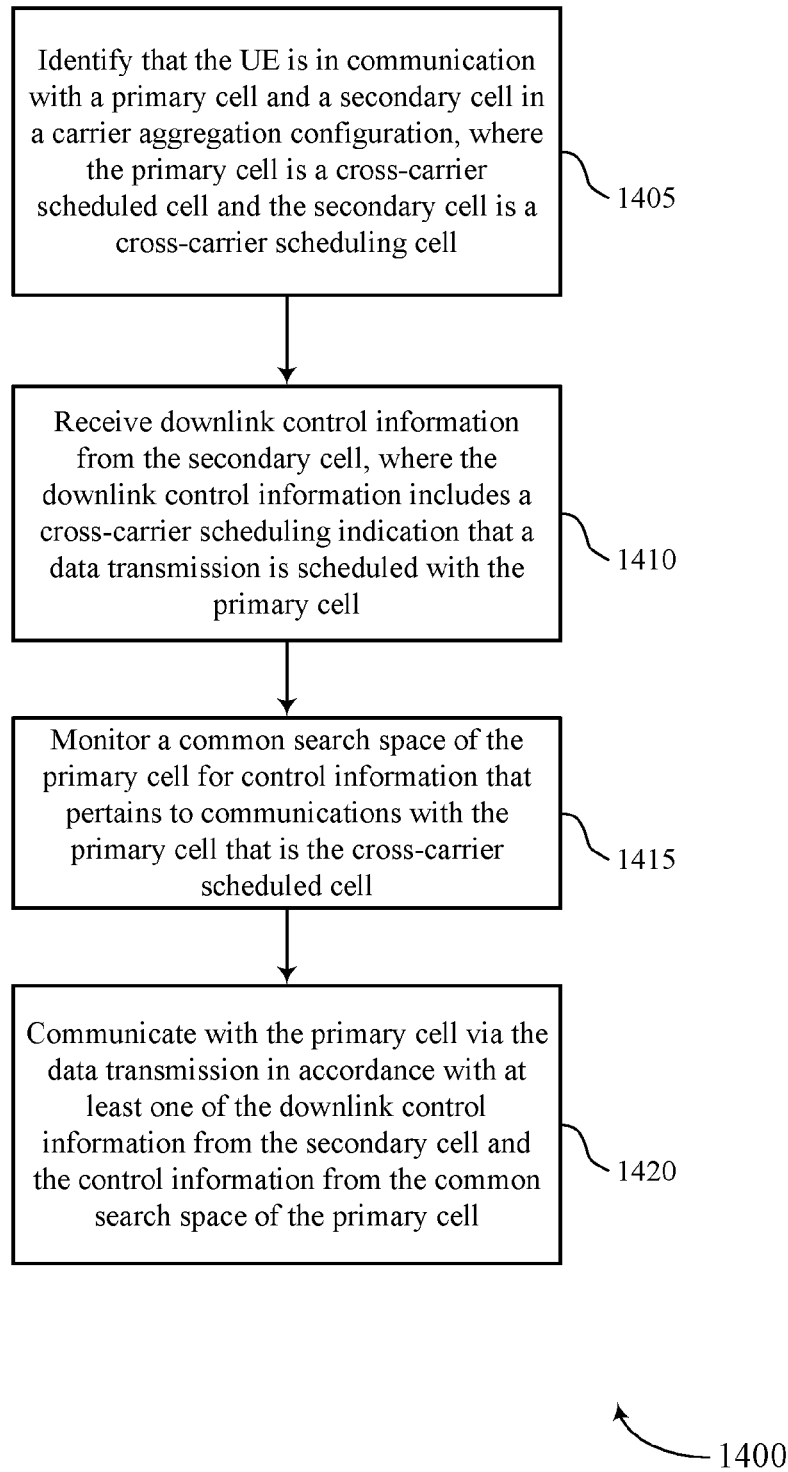
FIGS. 14 through 17 show flowcharts illustrating methods that support cross-carrier scheduling techniques for wireless communications systems in accordance with aspects of the present disclosure.

FIG. 14 shows a flowchart illustrating a method 1400 that supports cross-carrier scheduling techniques for wireless communications systems in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may identify that the UE is in communication with a primary cell and a secondary cell in a carrier aggregation configuration, where the primary cell is a cross-carrier scheduled cell and the secondary cell is a cross-carrier scheduling cell. The operations of 1405 may be performed according to the methods described herein. In some examples, aspects of the operations of 1405 may be performed by an aggregation component as described with reference to FIGS. 6 through 9.

At 1410, the UE may receive downlink control information from the secondary cell, where the downlink control information includes a cross-carrier scheduling indication that a data transmission is scheduled with the primary cell. The operations of 1410 may be performed according to the methods described herein. In some examples, aspects of the operations of 1410 may be performed by a secondary cell component as described with reference to FIGS. 6 through 9.

At 1415, the UE may monitor a common search space of the primary cell for control information that pertains to communications with the primary cell that is the cross-carrier scheduled cell. The operations of 1415 may be performed according to the methods described herein. In some examples, aspects of the operations of 1415 may be performed by a primary cell component as described with reference to FIGS. 6 through 9.

At 1420, the UE may communicate with the primary cell via the data transmission in accordance with at least one of the downlink control information from the secondary cell and the control information from the common search space of the primary cell. The operations of 1420 may be performed according to the methods described herein. In some examples, aspects of the operations of 1420 may be performed by a data component as described with reference to FIGS. 6 through 9.

Figure 15:
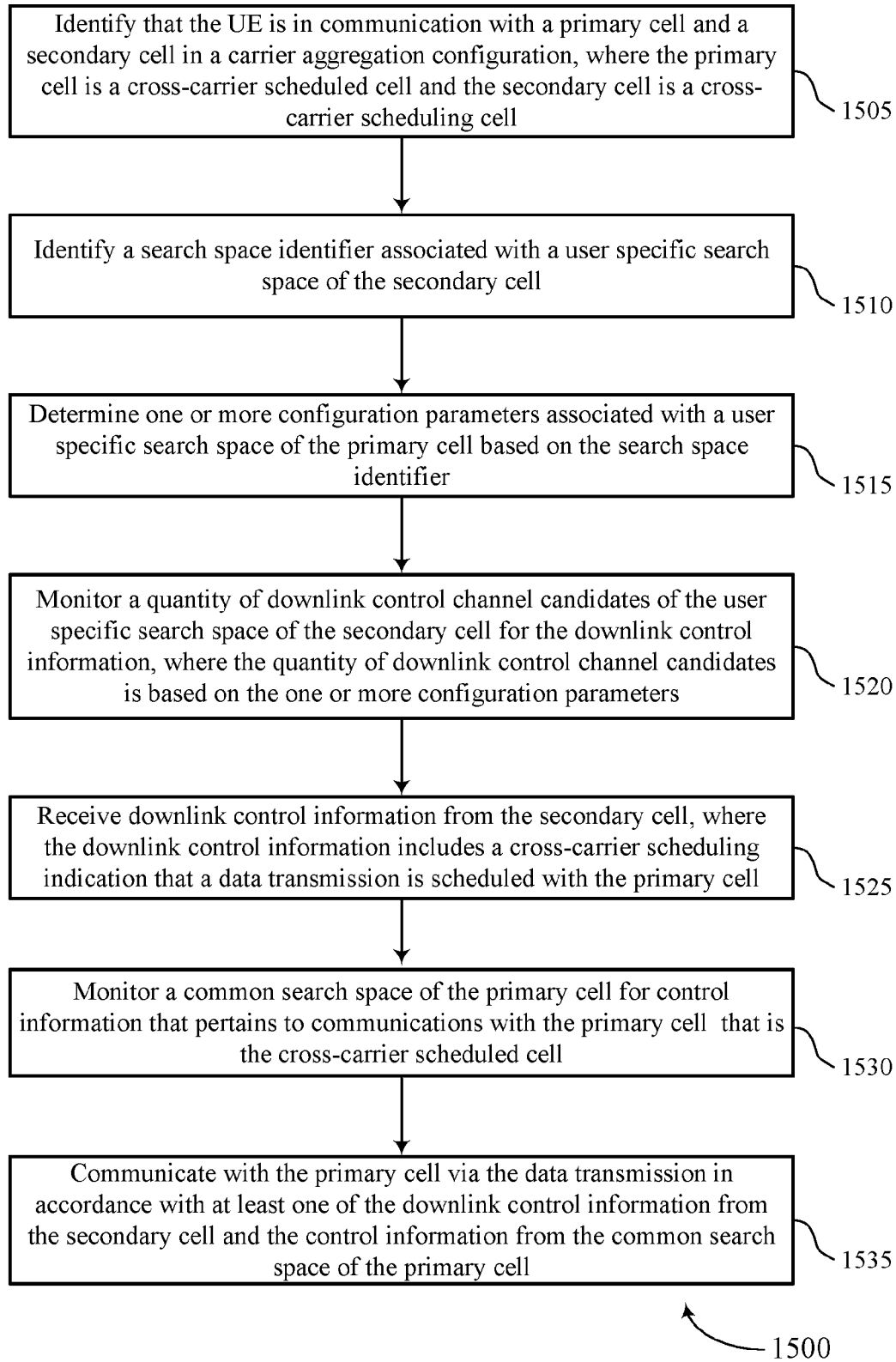

FIG. 15 shows a flowchart illustrating a method 1500 that supports cross-carrier scheduling techniques for wireless communications systems in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify that the UE is in communication with a primary cell and a secondary cell in a carrier aggregation configuration, where the primary cell is a cross-carrier scheduled cell and the secondary cell is a cross-carrier scheduling cell. The operations of 1505 may be performed according to the methods described herein. In some examples, aspects of the operations of 1505 may be performed by an aggregation component as described with reference to FIGS. 6 through 9.

At 1510, the UE may identify a search space identifier associated with a user specific search space of the secondary cell. The operations of 1510 may be performed according to the methods described herein. In some examples, aspects of the operations of 1510 may be performed by an identifier component as described with reference to FIGS. 6 through 9.

At 1515, the UE may determine one or more configuration parameters associated with a user specific search space of the primary cell based on the search space identifier. The operations of 1515 may be performed according to the methods described herein. In some examples, aspects of the operations of 1515 may be performed by a parameter component as described with reference to FIGS. 6 through 9.

At 1520, the UE may monitor a quantity of downlink control channel candidates of the user specific search space of the secondary cell for the downlink control information, where the quantity of downlink control channel candidates is based on the one or more configuration parameters. The operations of 1520 may be performed according to the methods described herein. In some examples, aspects of the operations of 1520 may be performed by a monitoring component as described with reference to FIGS. 6 through 9.

At 1525, the UE may receive downlink control information from the secondary cell, where the downlink control information includes a cross-carrier scheduling indication that a data transmission is scheduled with the primary cell. The operations of 1525 may be performed according to the methods described herein. In some examples, aspects of the operations of 1525 may be performed by a secondary cell component as described with reference to FIGS. 6 through 9.

At 1530, the UE may monitor a common search space of the primary cell for control information that pertains to communications with the primary cell that is the cross-carrier scheduled cell. The operations of 1530 may be performed according to the methods described herein. In some examples, aspects of the operations of 1530 may be performed by a primary cell component as described with reference to FIGS. 6 through 9.

At 1535, the UE may communicate with the primary cell via the data transmission in accordance with at least one of the downlink control information from the secondary cell and the control information from the common search space of the primary cell. The operations of 1535 may be performed according to the methods described herein. In some examples, aspects of the operations of 1535 may be performed by a data component as described with reference to FIGS. 6 through 9.

Figure 16:
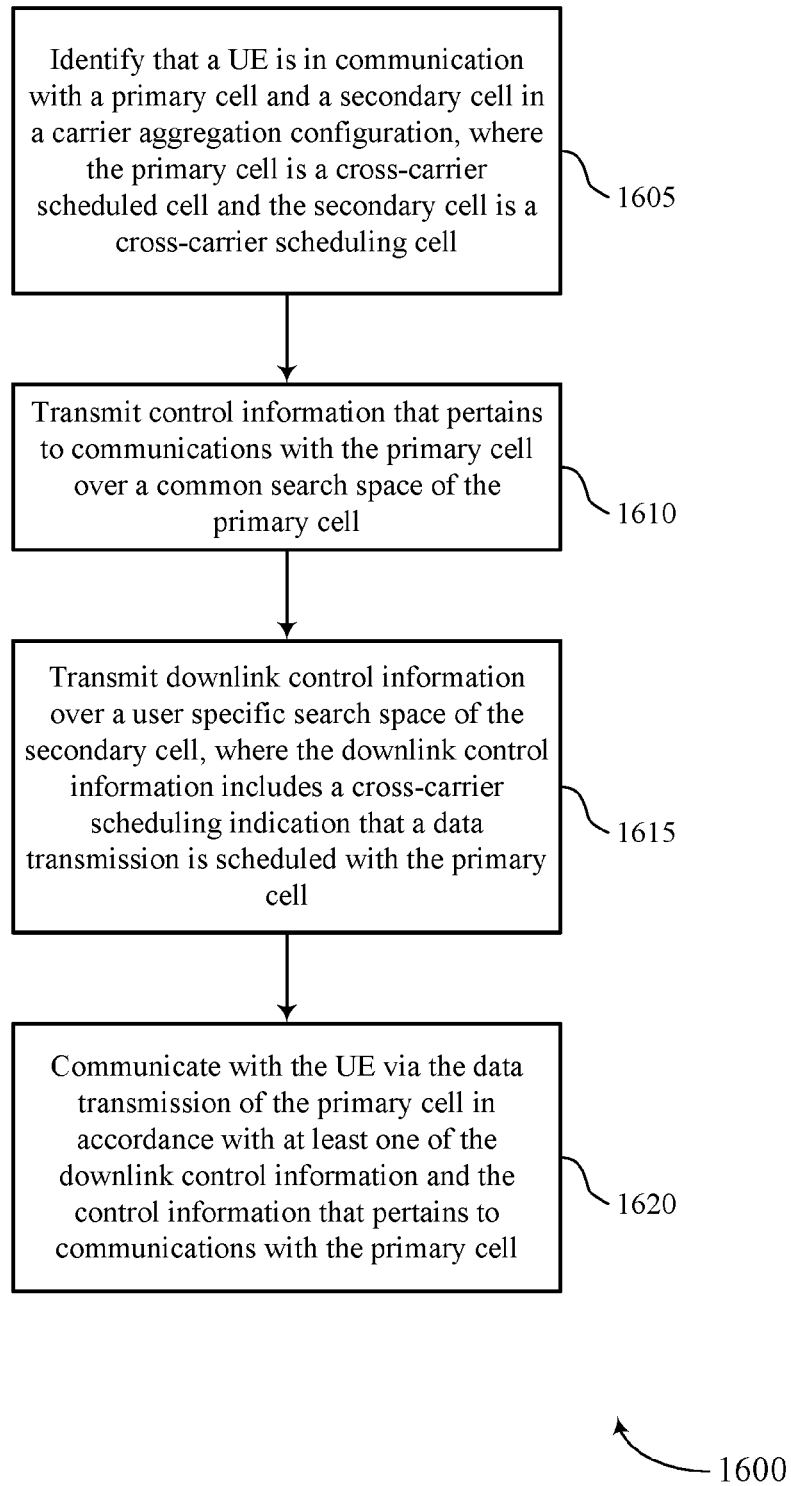

FIG. 16 shows a flowchart illustrating a method 1600 that supports cross-carrier scheduling techniques for wireless communications systems in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1605, the base station may identify that a UE is in communication with a primary cell and a secondary cell in a carrier aggregation configuration, where the primary cell is a cross-carrier scheduled cell and the secondary cell is a cross-carrier scheduling cell. The operations of 1605 may be performed according to the methods described herein. In some examples, aspects of the operations of 1605 may be performed by a carrier aggregation component as described with reference to FIGS. 10 through 13.

At 1610, the base station may transmit control information that pertains to communications with the primary cell over a common search space of the primary cell. The operations of 1610 may be performed according to the methods described herein. In some examples, aspects of the operations of 1610 may be performed by a common search space component as described with reference to FIGS. 10 through 13.

At 1615, the base station may transmit downlink control information over a user specific search space of the secondary cell, where the downlink control information includes a cross-carrier scheduling indication that a data transmission is scheduled with the primary cell. The operations of 1615 may be performed according to the methods described herein. In some examples, aspects of the operations of 1615 may be performed by a user specific search space component as described with reference to FIGS. 10 through 13.

At 1620, the base station may communicate with the UE via the data transmission of the primary cell in accordance with at least one of the downlink control information and the control information that pertains to communications with the primary cell. The operations of 1620 may be performed according to the methods described herein. In some examples, aspects of the operations of 1620 may be performed by a data module as described with reference to FIGS. 10 through 13.

Figure 17:
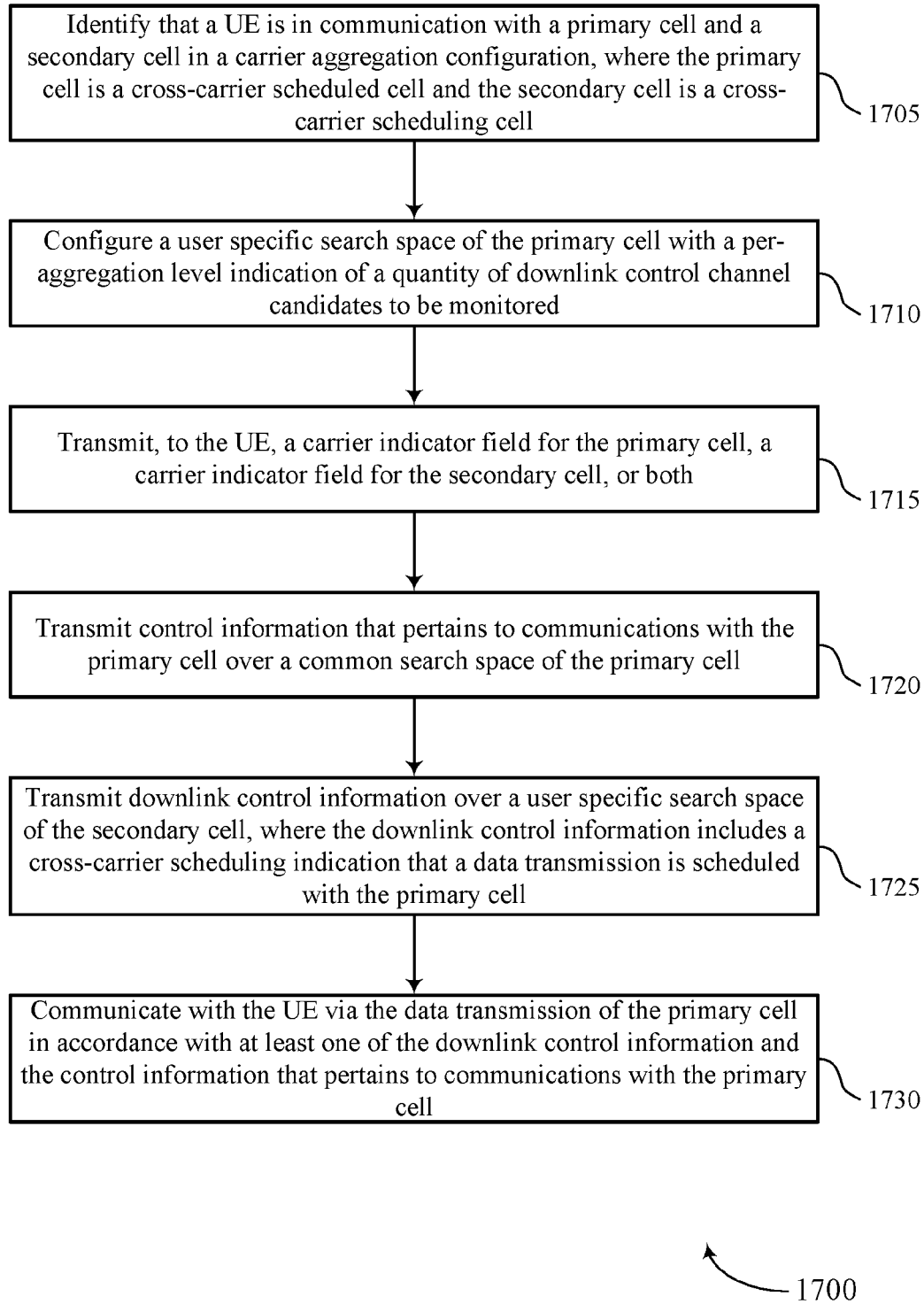

FIG. 17 shows a flowchart illustrating a method 1700 that supports cross-carrier scheduling techniques for wireless communications systems in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may identify that a UE is in communication with a primary cell and a secondary cell in a carrier aggregation configuration, where the primary cell is a cross-carrier scheduled cell and the secondary cell is a cross-carrier scheduling cell. The operations of 1705 may be performed according to the methods described herein. In some examples, aspects of the operations of 1705 may be performed by a carrier aggregation component as described with reference to FIGS. 10 through 13.

At 1710, the base station may configure a user specific search space of the primary cell with a per-aggregation level indication of a quantity of downlink control channel candidates to be monitored. The operations of 1710 may be performed according to the methods described herein. In some examples, aspects of the operations of 1710 may be performed by a user specific search space component as described with reference to FIGS. 10 through 13.

At 1715, the base station may transmit, to the UE, a carrier indicator field for the primary cell, a carrier indicator field for the secondary cell, or both. The operations of 1715 may be performed according to the methods described herein. In some examples, aspects of the operations of 1715 may be performed by a CIF component as described with reference to FIGS. 10 through 13.

At 1720, the base station may transmit control information that pertains to communications with the primary cell over a common search space of the primary cell. The operations of 1720 may be performed according to the methods described herein. In some examples, aspects of the operations of 1720 may be performed by a common search space component as described with reference to FIGS. 10 through 13.

At 1725, the base station may transmit downlink control information over a user specific search space of the secondary cell, where the downlink control information includes a cross-carrier scheduling indication that a data transmission is scheduled with the primary cell. The operations of 1725 may be performed according to the methods described herein. In some examples, aspects of the operations of 1725 may be performed by a user specific search space component as described with reference to FIGS. 10 through 13.

At 1730, the base station may communicate with the UE via the data transmission of the primary cell in accordance with at least one of the downlink control information and the control information that pertains to communications with the primary cell. The operations of 1730 may be performed according to the methods described herein. In some examples, aspects of the operations of 1730 may be performed by a data module as described with reference to FIGS. 10 through 13.

Described below are a number of examples of methods, systems or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples of possible examples, and other examples will be readily apparent to those skilled in the art without departing from the scope of the disclosure.

The following provides an overview of aspects of the present disclosure:

Aspect 1: A method for wireless communications at a UE, comprising: identifying that the UE is in communication with a primary cell and a secondary cell in a carrier aggregation configuration, wherein the primary cell is a cross-carrier scheduled cell and the secondary cell is a cross-carrier scheduling cell; receiving downlink control information from the secondary cell, wherein the downlink control information includes a cross-carrier scheduling indication that a data transmission is scheduled with the primary cell; monitoring a common search space of the primary cell for control information that pertains to communications with the primary cell that is the cross-carrier scheduled cell; and communicating with the primary cell via the data transmission in accordance with at least one of the downlink control information from the secondary cell and the control information from the common search space of the primary cell.

Aspect 2: The method of aspect 1, further comprising: identifying a search space identifier associated with a user specific search space of the secondary cell; determining one or more configuration parameters associated with a user specific search space of the primary cell based at least in part on the search space identifier; and monitoring a quantity of downlink control channel candidates of the user specific search space of the secondary cell for the downlink control information, wherein the quantity of downlink control channel candidates is based at least in part on the one or more configuration parameters.

Aspect 3: The method of aspects 1 or 2, wherein the one or more configuration parameters comprises a per-aggregation level indication of the quantity of downlink control channel candidates to be monitored.

Aspect 4: The method of any of aspects 1 through 3, wherein the search space identifier associated with the user specific search space of the secondary cell is the same as a search space identifier associated with the user specific search space of the primary cell.

Aspect 5: The method of any of aspects 1 through 4, further comprising: monitoring a first quantity of downlink control channel candidates in the secondary cell for information associated with the secondary cell; and monitoring a second quantity of downlink control channel candidates in the secondary cell for information associated with the primary cell.

Aspect 6: The method of aspect 5, further comprising: determining the first quantity of downlink control channel candidates based at least in part on a carrier indicator field corresponding to the secondary cell; and determining the second quantity of downlink control channel candidates based at least in part on a carrier indicator field corresponding to the primary cell, wherein the downlink control information comprises both the carrier indicator field corresponding to the secondary cell and the carrier indicator field corresponding to the primary cell.

Aspect 7: The method of any of aspects 1 through 6, further comprising: identifying a quantity of search spaces that the UE monitors on the primary cell and on the secondary cell, wherein the quantity of search spaces comprises the common search space of the primary cell and a user specific search space of the secondary cell; and determining whether the quantity of search spaces is less than or equal to a maximum quantity of search spaces that the UE is configured to monitor per bandwidth part.

Aspect 8: The method of aspect 7, wherein the quantity of search spaces comprises a user specific search space of the primary cell.

Aspect 9: The method of aspect 7, wherein the quantity of search spaces does not include a user specific search space of the primary cell in the quantity of search spaces.

Aspect 10: The method of any of aspects 1-9, further comprising: monitoring one or more downlink control channel candidates of the user specific search space of the secondary cell for the downlink control information.

Aspect 11: The method of any of aspects 1 through 10, further comprising: identifying a cell radio network temporary identifier; monitoring the common search space of the primary cell for the control information using the cell radio network temporary identifier; and monitoring a user specific search space of the secondary cell using the cell radio network temporary identifier, wherein receiving the downlink control information from the secondary cell is based at least in part on monitoring the user specific search space of the secondary cell.

Aspect 12: The method of any of aspects 1 through 11, wherein monitoring the common search space of the primary cell for the control information that pertains to communications with the primary cell comprises: monitoring a type0 common search space of the primary cell, a type0A common search space of the primary cell, a type1 common search space of the primary cell, a type2 common search space of the primary cell, a type3 common search space of the primary cell, or any combination thereof.

Aspect 13: The method of any of aspects 1 through 12, further comprising: performing one or more connectivity operations or mobility operations based at least in part on the control information that pertains to the communications with the primary cell.

Aspect 14: The method of any of aspects 1 through 13, wherein communicating with the primary cell via the data transmission comprises: receiving a downlink data transmission of the primary cell, transmitting an uplink data transmission of the primary cell, or both.

Aspect 15: An apparatus comprising at least one means for performing a method of any of aspects 1 to 14.

Aspect 16: An apparatus for wireless communications comprising: a processor; memory coupled with the processor; and instructions stored in the memory and executable by the processor to cause the apparatus to perform a method of any of aspects 1 to 14.

Aspect 17: A non-transitory computer-readable medium storing code for wireless communications, the code comprising instructions executable by a processor to perform a method of any of aspects 1 to 14.

Aspect 18: A method for wireless communications at a base station, comprising: identifying that a UE is in communication with a primary cell and a secondary cell in a carrier aggregation configuration, wherein the primary cell is a cross-carrier scheduled cell and the secondary cell is a cross-carrier scheduling cell; transmitting control information that pertains to communications with the primary cell over a common search space of the primary cell; transmitting downlink control information over a user specific search space of the secondary cell, wherein the downlink control information includes a cross-carrier scheduling indication that a data transmission is scheduled with the primary cell; and communicating with the UE via the data transmission of the primary cell in accordance with at least one of the downlink control information and the control information that pertains to communications with the primary cell.

Aspect 19: The method of aspect 18, wherein the common search space of the primary cell comprises a type0 common search space of the primary cell, a type0A common search space of the primary cell, a type1 common search space of the primary cell, a type2 common search space of the primary cell, a type3 common search space of the primary cell, or any combination thereof.

Aspect 20: The method of aspects 18 or 19, further comprising: configuring a user specific search space of the primary cell with a per-aggregation level indication of a quantity of downlink control channel candidates to be monitored; and transmitting, to the UE, a carrier indicator field for the primary cell, a carrier indicator field for the secondary cell, or both.

Aspect 21: The method of any of aspects 18 through 20, further comprising: configuring the UE with a search space identifier for a user specific search space of the primary cell and a search space identifier for a user specific search space of the secondary cell.

Aspect 22: The method of any of aspects 18 through 21, wherein the search space identifier for the user specific search space of the primary cell is the same as the search space identifier for the user specific search space of the secondary cell.

Aspect 23: The method of any of aspects 18 through 22, further comprising: receiving an indication of a capability of the UE; and configuring the UE to monitor a quantity of search spaces that satisfy a threshold quantity of search spaces for the UE to monitor per bandwidth part based at least in part on the capability of the UE, wherein the quantity of search spaces comprises the common search space of the primary cell and a user specific search space of the secondary cell.

Aspect 24: The method of aspect 23, wherein the quantity of search spaces comprises a user specific search space of the primary cell.

Aspect 25: The method of aspect 23, wherein the quantity of search spaces does not comprise a user specific search space of the primary cell.

Aspect 26: An apparatus comprising at least one means for performing a method of any of aspects 18 to 25.

Aspect 27: An apparatus for wireless communications comprising: a processor; memory coupled with the processor; and instructions stored in the memory and executable by the processor to cause the apparatus to perform a method of any of aspects 18 to 25.

Aspect 28: A non-transitory computer-readable medium storing code for wireless communications, the code comprising instructions executable by a processor to perform a method of any of aspects 18 to 25.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   identifying that the UE is in communication with a primary cell and a secondary cell in a carrier aggregation configuration, wherein the primary cell is a cross-carrier scheduled cell and the secondary cell is a cross-carrier scheduling cell;
   receiving downlink control information from the secondary cell, wherein the downlink control information includes a cross-carrier scheduling indication that a data transmission is scheduled with the primary cell;
   monitoring a common search space of the primary cell for control information that pertains to communications with the primary cell that is the cross-carrier scheduled cell; and
   communicating with the primary cell via the data transmission in accordance with at least one of the downlink control information from the secondary cell and the control information from the common search space of the primary cell.

2. The method of claim 1, further comprising:
   identifying a search space identifier associated with a user specific search space of the secondary cell;
   determining one or more configuration parameters associated with a user specific search space of the primary cell based at least in part on the search space identifier; and
   monitoring a quantity of downlink control channel candidates of the user specific search space of the secondary cell for the downlink control information, wherein the quantity of downlink control channel candidates is based at least in part on the one or more configuration parameters.

3. The method of claim 2, wherein the one or more configuration parameters comprises a per-aggregation level indication of the quantity of downlink control channel candidates to be monitored.

4. The method of claim 2, wherein the search space identifier associated with the user specific search space of the secondary cell is the same as a search space identifier associated with the user specific search space of the primary cell.

5. The method of claim 1, further comprising:
   monitoring a first quantity of downlink control channel candidates in the secondary cell for information associated with the secondary cell; and
   monitoring a second quantity of downlink control channel candidates in the secondary cell for information associated with the primary cell.

6. The method of claim 5, further comprising:
   determining the first quantity of downlink control channel candidates based at least in part on a carrier indicator field corresponding to the secondary cell; and
   determining the second quantity of downlink control channel candidates based at least in part on a carrier indicator field corresponding to the primary cell, wherein the downlink control information comprises both the carrier indicator field corresponding to the secondary cell and the carrier indicator field corresponding to the primary cell.

7. The method of claim 1, further comprising:
   identifying a quantity of search spaces that the UE monitors on the primary cell and on the secondary cell, wherein the quantity of search spaces comprises the common search space of the primary cell and a user specific search space of the secondary cell; and
   determining whether the quantity of search spaces is less than or equal to a maximum quantity of search spaces that the UE is configured to monitor per bandwidth part.

8. The method of claim 7, wherein the quantity of search spaces comprises a user specific search space of the primary cell.

9. The method of claim 7, wherein the quantity of search spaces does not include a user specific search space of the primary cell.

10. The method of claim 7, further comprising:
    monitoring one or more downlink control channel candidates of the user specific search space of the secondary cell for the downlink control information.

11. The method of claim 1, further comprising:
    identifying a cell radio network temporary identifier;
    monitoring the common search space of the primary cell for the control information using the cell radio network temporary identifier; and
    monitoring a user specific search space of the secondary cell using the cell radio network temporary identifier, wherein receiving the downlink control information from the secondary cell is based at least in part on monitoring the user specific search space of the secondary cell.

12. The method of claim 1, wherein monitoring the common search space of the primary cell for the control information that pertains to communications with the primary cell comprises:
    monitoring a type0 common search space of the primary cell, a type0A common search space of the primary cell, a type1 common search space of the primary cell, a type2 common search space of the primary cell, a type3 common search space of the primary cell, or any combination thereof.

13. The method of claim 1, further comprising:
    performing one or more connectivity operations or mobility operations based at least in part on the control information that pertains to the communications with the primary cell.

14. The method of claim 1, wherein communicating with the primary cell via the data transmission comprises:
    receiving a downlink data transmission of the primary cell, transmitting an uplink data transmission of the primary cell, or both.

15. A method for wireless communications at a base station, comprising:
    identifying that a user equipment (UE) is in communication with a primary cell and a secondary cell in a carrier aggregation configuration, wherein the primary cell is a cross-carrier scheduled cell and the secondary cell is a cross-carrier scheduling cell;
    transmitting control information that pertains to communications with the primary cell over a common search space of the primary cell;
    transmitting downlink control information over a user specific search space of the secondary cell, wherein the downlink control information includes a cross-carrier scheduling indication that a data transmission is scheduled with the primary cell; and
    communicating with the UE via the data transmission of the primary cell in accordance with at least one of the downlink control information and the control information that pertains to communications with the primary cell.

16. The method of claim 15, wherein the common search space of the primary cell comprises a type0 common search space of the primary cell, a type0A common search space of the primary cell, a type1 common search space of the primary cell, a type2 common search space of the primary cell, a type3 common search space of the primary cell, or any combination thereof.

17. The method of claim 15, further comprising:
configuring a user specific search space of the primary cell with a per-aggregation level indication of a quantity of downlink control channel candidates to be monitored; and
transmitting, to the UE, a carrier indicator field for the primary cell, a carrier indicator field for the secondary cell, or both.

18. The method of claim 15, further comprising:
configuring the UE with a search space identifier for a user specific search space of the primary cell and a search space identifier for a user specific search space of the secondary cell.

19. The method of claim 18, wherein the search space identifier for the user specific search space of the primary cell is the same as the search space identifier for the user specific search space of the secondary cell.

20. The method of claim 15, further comprising:
receiving an indication of a capability of the UE; and
configuring the UE to monitor a quantity of search spaces that satisfy a threshold quantity of search spaces for the UE to monitor per bandwidth part based at least in part on the capability of the UE, wherein the quantity of search spaces comprises the common search space of the primary cell and a user specific search space of the secondary cell.

21. The method of claim 20, wherein the quantity of search spaces comprises a user specific search space of the primary cell.

22. The method of claim 20, wherein the quantity of search spaces does not comprise a user specific search space of the primary cell.

23. An apparatus for wireless communications at a user equipment (UE), comprising:
a processor,
memory coupled with the processor; and
instructions stored in the memory and executable by the processor to cause the apparatus to:
identify that the UE is in communication with a primary cell and a secondary cell in a carrier aggregation configuration, wherein the primary cell is a cross-carrier scheduled cell and the secondary cell is a cross-carrier scheduling cell;
receive downlink control information from the secondary cell, wherein the downlink control information includes a cross-carrier scheduling indication that a data transmission is scheduled with the primary cell;
monitor a common search space of the primary cell for control information that pertains to communications with the primary cell that is the cross-carrier scheduled cell; and
communicate with the primary cell via the data transmission in accordance with at least one of the downlink control information from the secondary cell and the control information from the common search space of the primary cell.

24. The apparatus of claim 23, wherein the instructions are further executable by the processor to cause the apparatus to:
identify a search space identifier associated with a user specific search space of the secondary cell;
determine one or more configuration parameters associated with a user specific search space of the primary cell based at least in part on the search space identifier; and
monitor a quantity of downlink control channel candidates of the user specific search space of the secondary cell for the downlink control information, wherein the quantity of downlink control channel candidates is based at least in part on the one or more configuration parameters.

25. The apparatus of claim 24, wherein the one or more configuration parameters comprises a per-aggregation level indication of the quantity of downlink control channel candidates to be monitored.

26. The apparatus of claim 24, wherein the search space identifier associated with the user specific search space of the secondary cell is the same as a search space identifier associated with the user specific search space of the primary cell.

27. The apparatus of claim 23, wherein the instructions are further executable by the processor to cause the apparatus to:
monitor a first quantity of downlink control channel candidates in the secondary cell for information associated with the secondary cell; and
monitor a second quantity of downlink control channel candidates in the secondary cell for information associated with the primary cell.

28. The apparatus of claim 27, wherein the instructions are further executable by the processor to cause the apparatus to:
determine the first quantity of downlink control channel candidates based at least in part on a carrier indicator field corresponding to the secondary cell; and
determine the second quantity of downlink control channel candidates based at least in part on a carrier indicator field corresponding to the primary cell, wherein the downlink control information comprises both the carrier indicator field corresponding to the secondary cell and the carrier indicator field corresponding to the primary cell.

29. The apparatus of claim 23, wherein the instructions are further executable by the processor to cause the apparatus to:
identify a quantity of search spaces that the UE monitors on the primary cell and on the secondary cell, wherein the quantity of search spaces comprises the common search space of the primary cell and a user specific search space of the secondary cell; and
determine whether the quantity of search spaces is less than or equal to a maximum quantity of search spaces that the UE is configured to monitor per bandwidth part.

30. The apparatus of claim 29, wherein the quantity of search spaces comprises a user specific search space of the primary cell.

31. The apparatus of claim 29, wherein the quantity of search spaces does not include a user specific search space of the primary cell.

32. The apparatus of claim 29, wherein the instructions are further executable by the processor to cause the apparatus to:

monitor one or more downlink control channel candidates of the user specific search space of the secondary cell for the downlink control information.

33. The apparatus of claim 23, wherein the instructions are further executable by the processor to cause the apparatus to:
identify a cell radio network temporary identifier;
monitoring the common search space of the primary cell for the control information using the cell radio network temporary identifier; and
monitor a user specific search space of the secondary cell using the cell radio network temporary identifier, wherein receiving the downlink control information from the secondary cell is based at least in part on monitoring the user specific search space of the secondary cell.

34. The apparatus of claim 23, wherein the instructions to monitor the common search space of the primary cell for the control information that pertains to communications with the primary cell that is the cross-carrier scheduled cell are executable by the processor to cause the apparatus to:
monitor a type0 common search space of the primary cell, a type0A common search space of the primary cell, a type1 common search space of the primary cell, a type2 common search space of the primary cell, a type3 common search space of the primary cell, or any combination thereof.

35. The apparatus of claim 23, wherein the instructions are further executable by the processor to cause the apparatus to:
perform one or more connectivity operations or mobility operations based at least in part on the control information that pertains to the communications with the primary cell.

36. The apparatus of claim 23, wherein the instructions to communicate with the primary cell via the data transmission are executable by the processor to cause the apparatus to:
receive a downlink data transmission of the primary cell, transmitting an uplink data transmission of the primary cell, or both.

37. An apparatus for wireless communications at a base station, comprising:
a processor,
memory coupled with the processor; and
instructions stored in the memory and executable by the processor to cause the apparatus to:
identify that a user equipment (UE) is in communication with a primary cell and a secondary cell in a carrier aggregation configuration, wherein the primary cell is a cross-carrier scheduled cell and the secondary cell is a cross-carrier scheduling cell;
transmit control information that pertains to communications with the primary cell that is the cross-carrier scheduled cell over a common search space of the primary cell;
transmit downlink control information over a user specific search space of the secondary cell, wherein the downlink control information includes a cross-carrier scheduling indication that a data transmission is scheduled with the primary cell; and
communicate with the UE via the data transmission of the primary cell in accordance with at least one of the downlink control information and the control information that pertains to communications with the primary cell.

38. The apparatus of claim 37, wherein the common search space of the primary cell comprises a type0 common search space of the primary cell, a type0A common search space of the primary cell, a type1 common search space of the primary cell, a type2 common search space of the primary cell, a type3 common search space of the primary cell, or any combination thereof.

39. The apparatus of claim 37, wherein the instructions are further executable by the processor to cause the apparatus to:
configure a user specific search space of the primary cell with a per-aggregation level indication of a quantity of downlink control channel candidates to be monitored; and
transmit, to the UE, a carrier indicator field for the primary cell, a carrier indicator field for the secondary cell, or both.

40. The apparatus of claim 37, wherein the instructions are further executable by the processor to cause the apparatus to:
configure the UE with a search space identifier for a user specific search space of the primary cell and a search space identifier for a user specific search space of the secondary cell.

41. The apparatus of claim 40, wherein the search space identifier for the user specific search space of the primary cell is the same as the search space identifier for the user specific search space of the secondary cell.

42. The apparatus of claim 37, wherein the instructions are further executable by the processor to cause the apparatus to:
receive an indication of a capability of the UE; and
configure the UE to monitor a quantity of search spaces that satisfy a threshold quantity of search spaces for the UE to monitor per bandwidth part based at least in part on the capability of the UE, wherein the quantity of search spaces comprises the common search space of the primary cell and a user specific search space of the secondary cell.

43. The apparatus of claim 42, wherein the quantity of search spaces comprises a user specific search space of the primary cell.

44. The apparatus of claim 42, wherein the quantity of search spaces does not comprise a user specific search space of the primary cell.

* * * * *